United States Patent [19]
Batten, Jr.

[11] Patent Number: 5,675,713
[45] Date of Patent: Oct. 7, 1997

[54] SENSOR FOR USE IN A NEURAL NETWORK

[76] Inventor: George W. Batten, Jr., 2646 Aberdeen Way, Houston, Tex. 77025

[21] Appl. No.: 480,122

[22] Filed: Jun. 7, 1995

Related U.S. Application Data

[62] Division of Ser. No. 173,566, Dec. 22, 1993, Pat. No. 5,542,054.
[51] Int. Cl.$^6$ .................................................. G06F 15/18
[52] U.S. Cl. .................................................. 395/24; 395/22
[58] Field of Search .................................. 395/22, 24

[56] References Cited

U.S. PATENT DOCUMENTS

| | | | |
|---|---|---|---|
| 3,293,609 | 12/1966 | Martin | 395/24 |
| 3,435,422 | 3/1969 | Gerhardt et al. | 395/24 |
| 3,601,811 | 8/1971 | Yoshino | 340/172.5 |
| 4,891,782 | 1/1990 | Johnson | 364/786 |
| 4,994,982 | 2/1991 | Duranton et al. | 395/27 |
| 5,003,490 | 3/1991 | Castelaz et al. | 395/22 |
| 5,091,864 | 2/1992 | Baji et al. | 395/27 |
| 5,093,900 | 3/1992 | Graf | 395/24 |
| 5,097,141 | 3/1992 | Leivian et al. | 307/201 |
| 5,142,666 | 8/1992 | Yoshizawa et al. | 395/24 |
| 5,151,970 | 9/1992 | Engeler | 395/24 |
| 5,165,010 | 11/1992 | Musada et al. | 395/27 |
| 5,170,071 | 12/1992 | Shreve | 307/20 |
| 5,175,798 | 12/1992 | Taylor et al. | 395/27 |
| 5,195,171 | 3/1993 | Takatori et al. | 395/24 |
| 5,211,622 | 5/1993 | Liboff et al. | 600/9 |
| 5,262,968 | 11/1993 | Coffield | 364/604 |
| 5,359,700 | 10/1994 | Seligson | 395/24 |
| 5,379,252 | 1/1995 | Yamamoto | 365/183 |
| 5,381,804 | 1/1995 | Shambroom | 128/731 |

OTHER PUBLICATIONS

Widrow, Bernard, et al., "30 Years of Adaptive Neural Networks: Perceptron, Madaline, and Backpropagation", *Proceedings of the IEEE*, vol. 78, No. 9, Sep. 1990.

Park, Ph.D., Sangil, "Principles of Sigma–Delta Modulation for Analog–to–Digital Converters," Apr. 8, 1990, Motorola, Inc.

Candy, James C., et al., "Oversampling Delta–Sigma Data Converters Theory, Design, and Simulation," The Institute of Electrical and Electronics Engineers, Inc., New York.

Watanabe, Takao, et al, "A Single 1.5–V Digital Chip for a $10^6$ Synapse Neural Network," *IEEE Transactions on Neural Networks*, vol. 4, No. 3, May 1993.

Widrow, Bernard, et al., "The Adaptive Linear Combiner," *Adaptive Signal Processing*, 1985, Chapter 2, pp. 15–26.

Rabiner, Lawrence R., et al., "Theory and Application of Digital Signal Processing", Prentice–Hall, Inc., Englewood Cliffs, New Jersey, pp. 326–329.

Oppenheim, Alan V., et al., "Digital Signal Processing," Prentice–Hall, Inc., Englewood Cliffs, New Jersey, pp. 413–432.

Gorse, D., et al., "On the Equivalence and Properties of Noisy Neural and Probabilistic Ram Nets," *Physics Letters A*, vol. 131, No. 6, pp. 326–332, Aug. 29, 1988.

(List continued on next page.)

*Primary Examiner*—George B. Davis
*Attorney, Agent, or Firm*—Conley, Rose & Tayon, PC; Michael F. Heim

[57] ABSTRACT

An artificial neuron for use in a neural processing network comprises a plurality of input signal lines, an arrangement for computing a nonlinear function of the sum of the inputs multiplied by associated weights, and a saturating delta-sigma modulator which oversamples the computed value and produces an encoded neuron output signal. Conversion of signals for use by these neurons preferably is performed by delta-sigma modulators at the inputs to the neurons, which may be incorporated directly into sensors. Processing of the output signals from the neuron includes low-pass filtering and decimation. The present invention may be used in many diverse areas. For example, arrays of sensors with delta signal modulators may be coupled with a network of the neurons to form an intelligent vision system. Linear signal processing, both conventional and adaptive, can be done by a simple neuronal system that operates linearly.

5 Claims, 11 Drawing Sheets

OTHER PUBLICATIONS

Shandle, Jack, "Neural Networks are Ready for Prime Time," *Electronic Design*, Feb. 18, 1993, pp. 51–58.

Lippmann, Richard P., "An Introduction to Computing with Neural Nets," *IEEE ASSP Magazine*, Apr. 1987.

Duranton, et al., "A General Purpose Digital Architecture for Neural Network Simulations", 1st IEE Inter. Conf. on Artificial Neural Networks, 16–18 Oct. 1989.

Duranton, et al., "The LNeuro Chip: A Digital VLSI On–Chip Learning Mechanism", figure 1, Int'l Neural Network Conference, Jul. 9–13, 1990.

SATURATING ADDER: ⊕̄

SENSOR FOR USE IN A NEURAL NETWORK

This is a divisional application of application Ser. No. 08/173,566, filed Dec. 22, 1993, U.S. Pat. No. 5,542,054.

FIELD AND BACKGROUND OF THE INVENTION

This invention relates generally to artificial neurons, which simulate the action of biological neurons, and more particularly, to neurons which operate by using a form of delta-sigma modulation to encode the neural states.

Generally, as shown in FIG. 1, an artificial neuron comprises a number of input signal paths, $x_0, x_1, \ldots x_n$, a signal weighting element $w_0, w_1, \ldots w_n$, with a corresponding numerical weight value associated with each input signal; a plurality of multipliers 101 for combining the input signal x with the weighing element w to provide a weighted input signal xw; an adder 103, which combines the weighted input signals xw to produce an intermediate signal u; and an element which transforms the intermediate signal u (usually by a nonlinear function F) to produce the output signal y of the neuron. A general discussion on neural networks and neurons generally is found in Widrow, et. al., "30 Years of Adaptive Neural Networks: Perceptron, Madaline, and Backpropagation," Proceedings of the IEEE, Vol 78, No. 9, September 1990.

Artificial neurons may take many forms. Early studies were focused on neurons that operated entirely with continuous-time signals in the analog domain. More recently, neurons have been developed which use digital processing. In these digital neurons, the input and output signals typically are discrete-time, multibit digital values with the weights and computations stored digitally. Regardless of whether the neuron was analog or digital, the computation, including multiplication of the weights, addition of the weighted signals, and transformation by the nonlinear function, required a relatively complex system.

There have been several attempts to develop simpler data transfer technologies for use with neurons. In U.S. Pat. No. 5,170,071 to Shreve, the proposed artificial neuron is based on representing both the input signals and the weights as pseudorandom sequences, with a digital logic structure performing the computations. Counters within each of the variable weighting elements, which perform the weight multiplications, convert a common pseudorandom (noise) sequence into pseudorandom sequences with appropriate duty cycles. The system includes hardware for the backpropagation algorithm for training (i.e., determine the weights). This method does not use multiplexers or memories.

In U.S. Pat. No. 5,175,798 to Taylor, et al., input two-state signals are used that collectively form the address for identifying in a random access memory a numerical value, that then is used to convert a noise signal into a two-state signal with appropriate duty cycle.

The parameters of a neural processing network and of the interconnection pattern of the network and the weights of the neurons must be chosen for each particular application. The term "training" often is used to describe the selection of the parameters. If a network interconnection pattern is fixed, then training is performed by determining the appropriate weight values. Numerous methods for determining the appropriate weight values have been developed. The mathematical principles behind some of them depend on the smoothness of the transforming function F. A particular example of this is the backpropagation method, as generally described in Widrow, et. al, "30 Years of Adaptive Neural Networks: Perceptron, Madaline, and Backpropagation."

In order to simplify the system, the signal paths to and from the neuron could be configured as two-state channels, with the signal values encoded in some manner. One possible method is to encode the signal values to use each channel to pass multibit digital values in a serial manner. Another possible method is to use the signal pattern to encode the value by using the duty cycle of the signal for the value. This type of data transmission is commonly done in communications systems using delta modulation.

The neuron constructed in accordance with the preferred embodiment can be implemented, with relatively minor modifications, for use in either single bit or multibit networks. Either analog or digital circuitry can be used for the computations performed within the neuron. A central feature of the operation is conversion of data from the representational form used within the neuron to the form used outside the neuron (i.e., in the neural network). This conversion is achieved by using a delta-sigma modulator, or equivalent device, in the neuron itself to produce an output signal which has a certain psuedorandom character. Noise introduced by this process is pushed to high frequencies, so it is separated from the low frequency information-carrying signal. This separation of noise permits higher resolution of the information-carrying signal.

SUMMARY OF THE INVENTION

The present invention constructed in accordance with the preferred embodiment comprises a class of artificial neurons which are formed by adding a form of a delta-sigma modulator to the output portion of an artificial neuron. A neuron with a delta-sigma modulator as part of its output will be referred to herein as a "DS-neuron." In the simplest form, the input signals and output signals of a DS-neuron preferably are two-state signals that carry the synaptic (input) and axonal (output) data as encoded pulse sequences that are similar to the delta-modulated pulse sequences of certain communication systems. The use of delta-sigma modulation allows the data to be communicated on single-channel paths and provides for simple parameter-storage and computational structures within a neuron. The use of delta-sigma modulation techniques provides a desirable shifting of noise power away from the information-carrying frequency band to permit greater signal resolution.

DETAILED DESCRIPTION OF THE PREFERRED EMBODIMENTS

General Discussion

Figure 2:
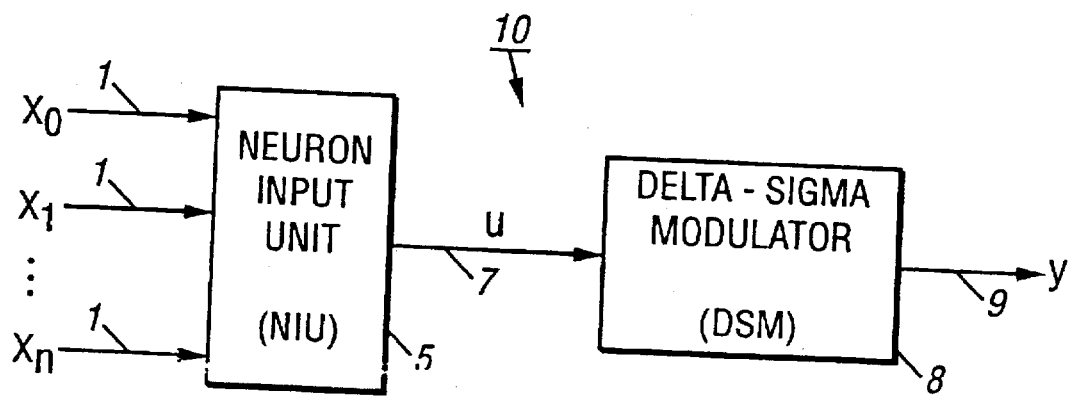
FIG. 2 shows a block diagram of a generic DS-neuron constructed in accordance with the preferred embodiment.

Referring now to FIG. 2, a DS-neuron 10 constructed in accordance with the preferred embodiment includes a number (n+1) of input signals $x_0, x_1, \ldots, x_n$ on input signal paths 1 to the neuron input unit (NIU) 5. Typically, input signal $x_0$ is a nonzero constant value, such as 1. After the NIU 5 receives the input signals x, it produces an intermediate signal u on signal path 7. Intermediate signal u then is encoded by a delta-sigma modulator 8 in accordance with the preferred embodiment to produce the output signal y on the output signal path 9 of the DS-neuron 10.

Generally, NIU 5 produces the modified sum-of-products $$u = G(s), \quad (1)$$

where G(s) is an appropriate transfer function and $$s = w_0 x_0 + w_1 x_1 + \ldots + w_n x_n, \quad (2)$$

wherein the quantities $w_0, w_1, \ldots,$ and $w_n$ are numerical weight values stored in the NIU 5. Although the NIU 5 appears to function as an artificial neuron as described in relation to FIG. 1 (but with the function F replaced by G), the purpose of the function G is different from that of F, and, in many instances, the transfer function G can be eliminated because of the implementation of the delta-sigma modulator 8.

While the present invention is not limited to the use of input signals x or output signals y that are single-line, two-state signals, this type of signal does have certain advantages in a neural processing network.

Figure 3:
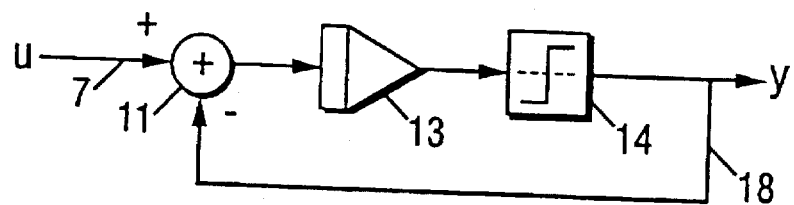
FIG. 3 shows a block diagram of a first-order, delta-sigma modulator.

Referring now to FIG. 3, a first order delta-sigma modulator with a two-state output preferably includes an adder 11, an integrator 13, and a comparator 14. The delta-sigma modulator integrates the difference between the intermediate signal u (which is the output signal from the NIU 5) on signal path 7, and the output signal on signal path 18. The integrated signal then is quantized by comparator 14 to one of two states.

The present invention is not limited by the particular characteristics of the intermediate signal u from the NIU 5. The intermediate signal u, for example, could be an analog signal. If an analog intermediate signal is desired, the adder 11 and integrator 13 of the delta-sigma modulator would operate in the analog domain, and the delta-sigma modulator would, in effect, provide analog-to-digital conversion in the process of generating the output signal y. If, alternatively, the intermediate signal u from the NIU were a digital signal, then the signal u could be passed as a digital value on a data bus carrying an appropriate number of bits in parallel, with the delta-sigma modulator operating in the digital domain. This and numerous other forms of delta-sigma modulators are described in Candy and Temes, "Oversampling Methods for A/D and D/A Conversion," *Oversampling Delta-Sigma Data Converters*, (IEEE Press), 1992. Other arrangements for delta-sigma modulators may be found in Park, "Principles of Sigma-Delta Modulation for Analog-to-Digital Converters," Motorola Literature Number APR8/D 1990.

Figure 4:
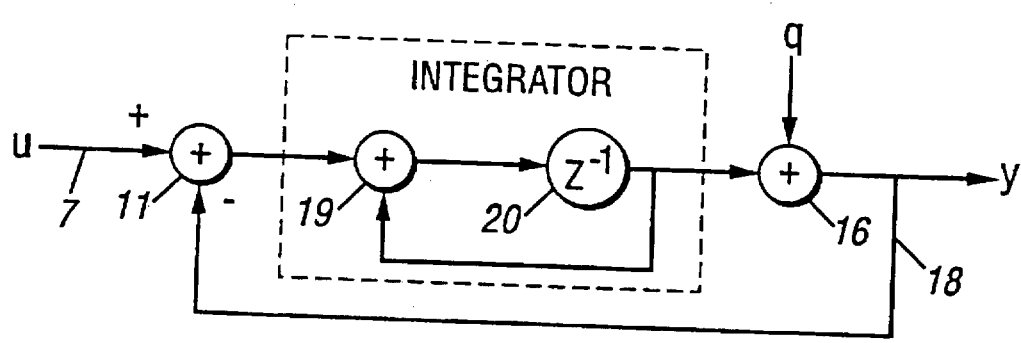
FIG. 4 is a signal-flow diagram of a discrete-time, first-order delta-sigma modulator.

An equivalent signal flow diagram of a discrete-time delta-sigma modulator is shown in FIG. 4, where the block 20 labeled "$z^{-1}$" (which is the conventional z-transform notation) denotes a delay of one time-step and the integrator (13 of FIG. 3) is shown in FIG. 4 as an adder 19 with a feedback through the delay 20. The quantizer (14 of FIG. 3) has been replaced by adder 16, which adds in a quantizer error q.

For the first-order delta-sigma modulator of FIG. 4, the output $y_k$ and input $u_k$ at time-step k are related by $$y_k = u_{k-1} + (q_k - q_{k-1}), \quad (3)$$

where $q_k$ is the error ("quantization error") introduced by the adder 16 (or quantizer 14) at step k. In a practical system, adder 19 has a limited range and overflow can occur, but Equation 3 holds provided that the intermediate signal u (for all values, $u_0, u_1, \ldots, u_n$) remains sufficiently small in absolute value.

As long as u remains sufficiently small in magnitude, and if u is active (i.e., changing fairly rapidly) and highly oversampled—that is, the sampling rate $f_s$ of the delta sigma modulator is much much greater than twice the highest frequency $f_0$ of the intermediate signal u—the quantization error time series q appears to be almost white random noise. In actuality, the quantization error time series is completely determined by the initial state of the integrator and the input signal u. The apparent randomness of the quantization error time series is analogous to that of a conventional pseudo-random number generator.

Figure 5:
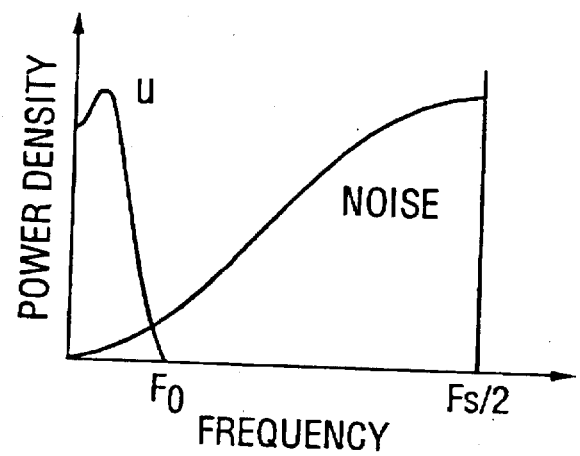
FIG. 5 illustrates the power spectra of neural signals that are found in the preferred embodiment of FIG. 2.

The differencing of consecutive values of the quantization error q moves the power of the error component of the output signal $y_k$ to higher frequencies. If a high sampling rate f, is used, most of the error power will be at sufficiently high frequencies so that the error can, if necessary, be removed by subsequent low-pass filtering and decimation (not shown). The power density of the signal and noise is shown schematically in the power-spectrum diagram of FIG. 5. Higher-order and cascaded delta-sigma filters provide better error performance in many situations, while providing the same input-output relationship except for the quantization error. The use of higher order and cascaded delta-sigma modulators is known. See Candy and Temes, id.

Figure 6:
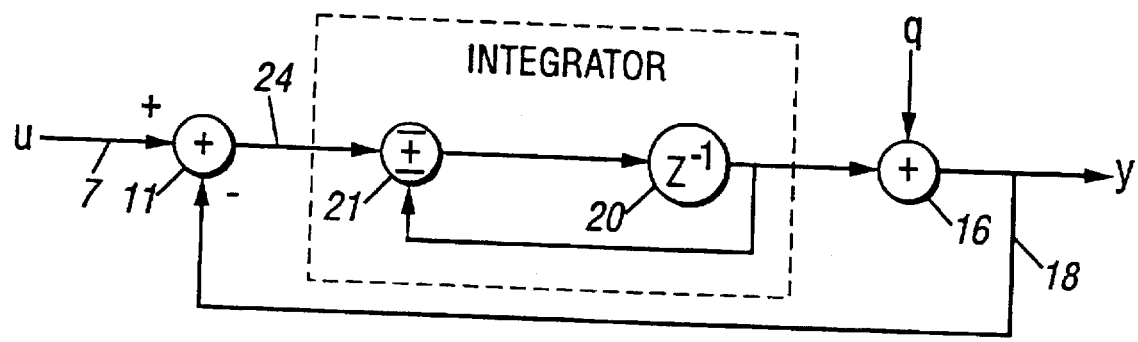
FIG. 6 illustrates a signal-flow diagram of a discrete-time, first-order saturating delta-sigma modulator as used in the preferred embodiment of FIG. 2.
Figure 7:
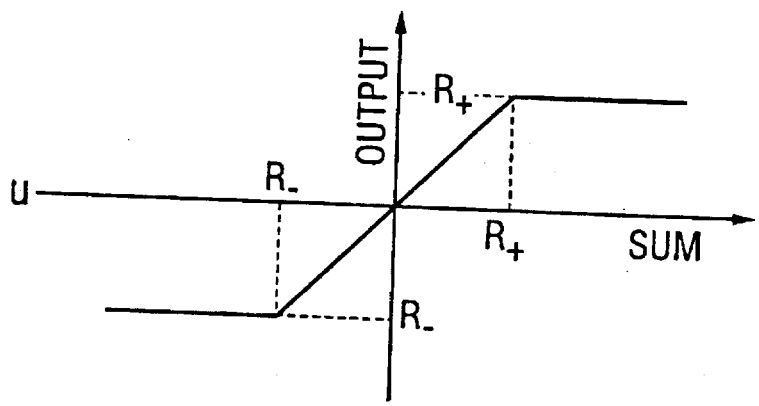
FIG. 7 shows a transfer function of a saturating adder as used in FIG. 6.

Referring now to FIGS. 6 and 7, the delta-sigma modulator constructed in accordance with the preferred embodiment substitutes a saturating adder 19 (in FIG. 6) for the ideal adder shown in FIG. 4. As shown graphically in FIG. 7, there are associated range values R and R+ such that the output is the sum S of the inputs if $R_- \leq S \leq R_+$; otherwise the output is the value $R_-$ or $R_+$ nearest to S. The term "saturating adder" is used herein to refer to an adder 21 as shown in FIG. 6 with the general characteristics depicted in FIG. 7. Conventional binary adders, conversely, overflow instead of saturating. Saturating adders are commonly used in signal-processing systems. See e.g. Oppenheim and Schafer, *Digital Signal Processing*, Englewood Cliffs, N.J. (Prentice-Hall) 1975, at 430, or Rabiner and Gold *Theory and Application of Digital Signal Processing*, Englewood Cliffs, N.J. (Prentice-Hall) 1975, at 328–329.

In general, a saturating adder satisfies the condition $$\text{Output}=R(\text{Sum}), \quad (4)$$

where R is a function describing the saturation. It is not necessary that R be identical to the function depicted in FIG. 7. As an example, a smooth sigmoidal function could be used, if desired.

The delta-sigma modulator (DSM) of FIG. 6 exhibits saturation. As the intermediate signal u increases, the fraction of time that the output signal y is in the high state increases until the input on path 24 to the integrator is always positive. When this happens, the integrator output moves to saturation, and the output signal y becomes fixed in the highest state. There is a corresponding behavior for decreasing inputs. For purposes of this disclosure, unless it is otherwise indicated, it will be understood that all delta-sigma modulators (of any order) saturate in this fashion. As one skilled in the art will realize, scaling (multiplication by a constant) of the output feedback on signal path 18 may be provided.

Referring again to FIG. 2, the artificial neuron constructed in accordance with the preferred embodiment includes a saturating delta-sigma modulator, as shown in FIG. 6. Consequently, as the intermediate signals u become large (up to some limit, and according to a time-average) in magnitude, the output signal y of the delta-sigma modulator saturates, providing a limiting input-output relationship. This type of limiting input-output relationship is substantially the same type of relationship for which the function F (in FIG. 1) was introduced in prior art artificial neurons. As a result, the delta-sigma modulator preferably replaces the transforming function F.

Figure 8:
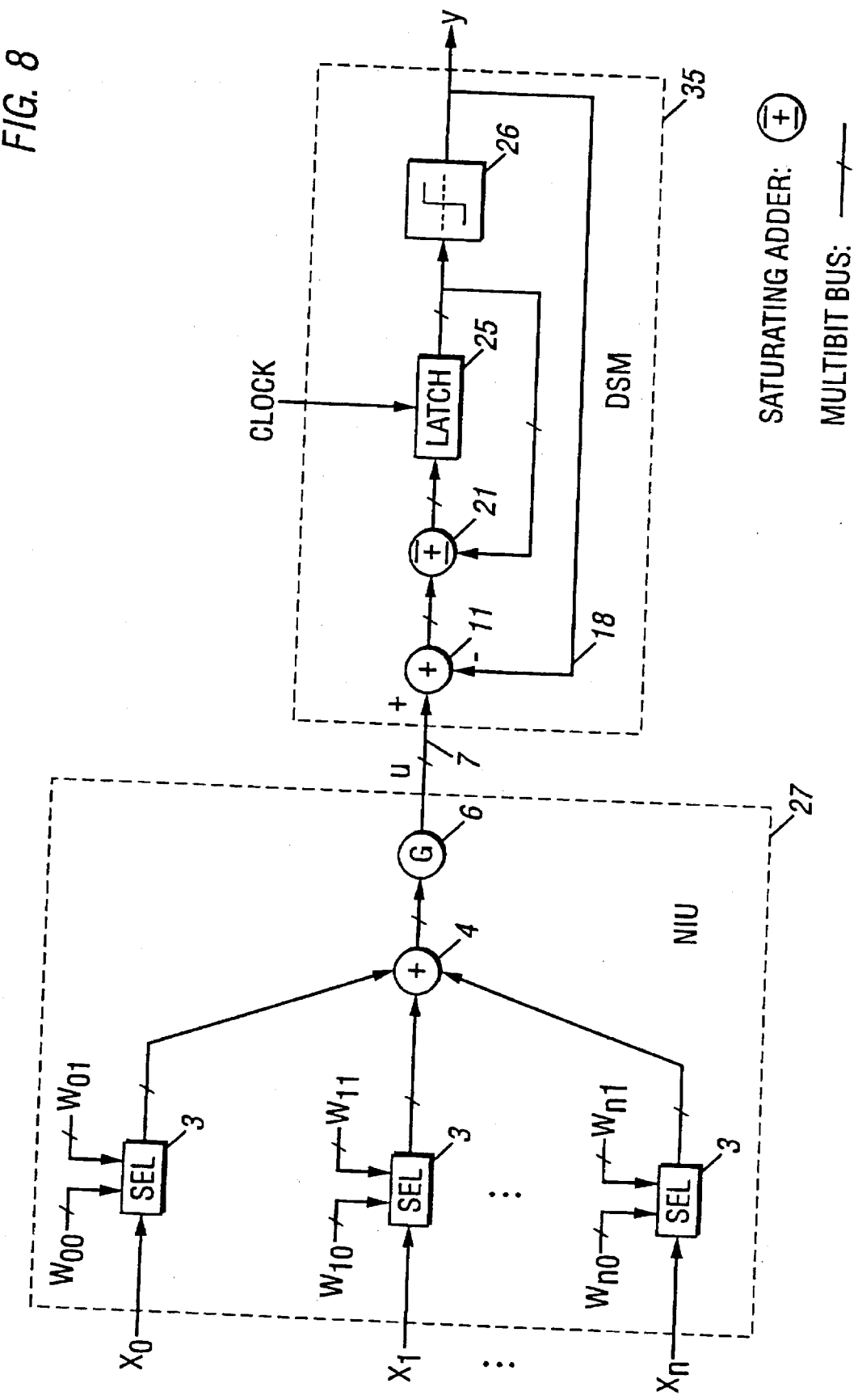
FIG. 8 shows a DS-neuron with two-state input and output signals, corresponding to the flow diagram of FIG. 6.

Referring now to FIG. 8, a detailed diagram of the artificial neuron of FIG. 2 is illustrated, constructed in accordance with the preferred embodiment of the present invention. The generic artificial neuron of FIG. 8 generally comprises a neuron input unit 27 and a delta-sigma modulator 35. As one skilled in the art will realize, the delta-sigma modulator 35 shown in FIG. 8 is substantially the same as the delta-sigma modulator depicted in FIG. 6, discussed above.

The neuron input network 27 preferably comprises a plurality of selector units 3, each of which receives a single input signal x (shown as $x_0, x_1, \ldots x_n$). A plurality of weight factors w also are provided to each selector unit 3. The subscript digits 0 and 1 are used to identify the states of the weight values. The quantity $w_{ji}$ is the product of $x_j$ and $w_j$, for $x_j$ in state i (i=0 or 1). These product values (which will be called "weight-products") are stored in registers (not shown). The output lines of the selectors 3 are provided as an input path to adder 4. The adder 4 adds the various outputs from the selectors and provides the summed output to a transfer function G. For each input x, a selector 3 passes the appropriate weight-product, corresponding to the input value x, to adder 4. Adder 4 then computes the sum s of all such weight-products. Transfer unit 6 transforms s, thereby producing intermediate signal u, which is processed by the DSM 35 to produce the output signal y.

Referring still to FIG. 8, the delta-sigma modulator 35 of the artificial delta-sigma neuron comprises an adder 11, a saturating adder 21, a latch 25 and a comparator 26. The latch 28 corresponds to the delay 20 of FIG. 6. As one skilled in the art will realize, the term "latch" defines a device, such as a register of master-slave flip-flops, which captures the input value in one time step and presents it as the output value to be used in the next time step. The preferred embodiment of the comparator 26 is a unit that tests the sign of the input signal and produces a low or high output value according to whether the input signal is negative or positive, respectively. Scaling of the output feedback along path 18 within the DSM may be necessary. Unit 6 can be omitted if it is not needed (i.e., if G is the identity function).

If, as is often the case, a weight-product $w_{j0}$ is merely the negative of $w_{j1}$ (so that $w_{00}$ is the negative of $w_{01}$), only one of the two weight values is needed. If only one weight value is used, the corresponding selector unit 3 can be replaced by a unit that selectively (depending on the input value x) negates the stored weight-product. Thus, for example, if $x_1$ is 1, the weight product w is selected. If $x_1$ is –1, then weight product $-w_1$ is selected. Also, if $x_0$ is a constant value, which typically is the case, the corresponding selector can be removed entirely, and the appropriate weight-product may be transmitted directly to the adder 4.

Figure 1:
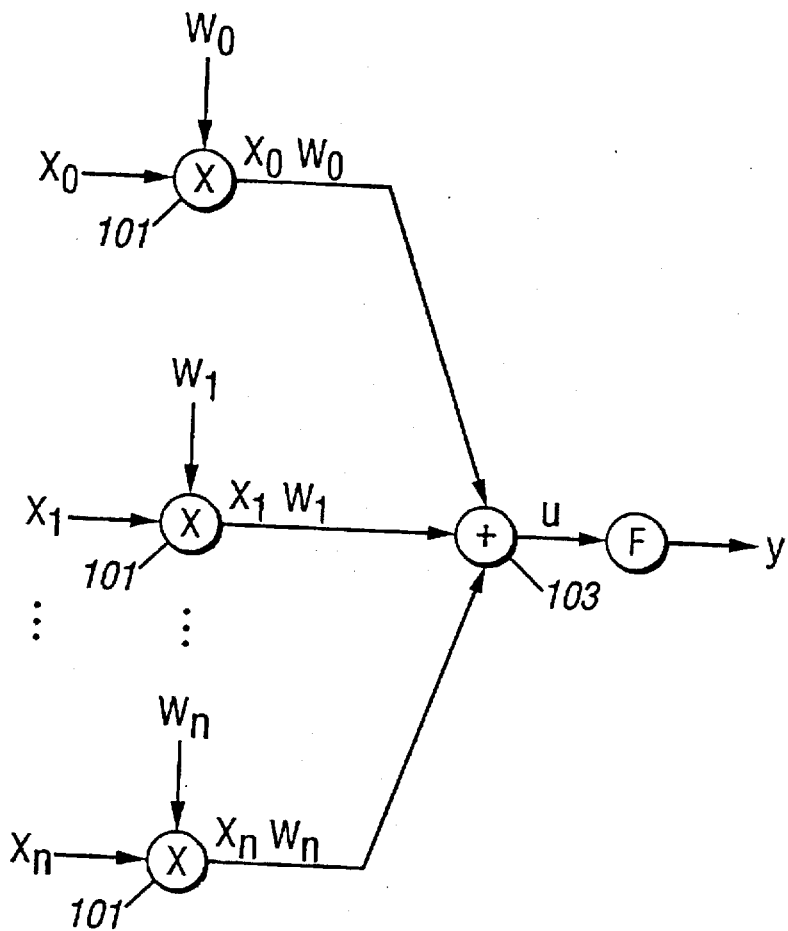
FIG. 1 shows a block diagram of a generic prior art artificial neuron.

The transfer function F found in the prior art neuron of FIG. 1 functions to compress the output signal data. Because the data in the input signals is preferably time-encoded, the function G (of the NIU 5) does not have the same effect as that of the function F of a neuron. The DSM 35 provides the compression-type nonlinearty (through the saturation effect mentioned above) that is required for neuronal action. The function G, therefore, only is used, if necessary, to restrict the amplitude of the intermediate signal u to the DSM 8. Moreover, it should be noted that the amplitude of the intermediate signal u already is limited by the value of the input signals x and weights w ($\{s\} \leq$ sum of $\{w_j\}$, assuming that $\{x_j\} \leq 1$ for j=0,1, ... ,n).

In a network of DS-neurons, $u_k$ is obtained from the output paths of other delta-sigma modulators and the input signals to the network. If all delta-sigma modulators operate at the same sampling rate, $u_k$ will not meet the oversampling condition—that is its power is not limited to a band $0 \leq f_0$ with $f_0 << f/2$. Nevertheless, the signal $u_k$ will comprise an information component $d_k$ with low bandwidth and an error component $e_k$, so Equation 3 can be written $$y_k = d_{k-1} + e_{k-1} + (q_k - q_{k-1}). \quad (5)$$

If G is linear, $u_k$ is a weighted sum of outputs from other delta-sigma modulators (in other neurons) and input signals to the network, and it follows that the spectral distribution for $e_k$ is similar to that of $q_k - q_{k-1}$. Thus, the low bandwidth information signal is passed through the system and preferably is filtered only at the output of the neural network to separate the signal from the noise. During training, however, it may be preferable to include a filter on the output of each neuron in the network to ensure high signal resolution and to eliminate potential training errors arising from noise. Nonlinearity introduced by the function G and the saturation of the DSM distorts the separation of the signal and noise, but $d_k$, $e_k$, and ($q_k - q_{k-1}$) are practically uncorrelated, so the essential properties of processing of the information signal may still be derived with relative ease.

Nonlinear functions tend to redistribute signal power across frequencies, so some of the noise would appear in the low-frequency band of the information signal $d_k$, but with the low correlation between the signal and noise components the effect tends to be small, especially for a high oversampling ratio of $OSR=f_s/(2 f_0)$, which is preferably greater than 10.

In many instances, the input signals x used in a neural network system will not be a two-state signal. For example, the input signals x may be analog or graded digital signals. To use these types of input signals in the neural network system constructed in accordance with the preferred embodiment, appropriate conversion can be done by a suitable delta-sigma modulator for each input path into the network.

I. ALTERNATIVE EMBODIMENTS OF DS NEURONS

The generic delta-sigma (DS) neuron described in FIG. 8 can be modified in many ways, depending on the application. The particular embodiment of the generic DS-neuron of FIG. 8, therefore, depends on the application for which it is to be used. For example, some applications are developed that use neural networks embodied within software to control general purpose computers. Obviously, in these applications, the artificial neurons of the present invention must also be embodied in software. One such embodiment is detailed below in the section entitled "Software Embodiment of DS-Neuron."

Alternatively, for DS-neurons with a relatively small number of input signals, the memory-based embodiments described below in the section entitled "Memory-Based DS-Neurons", are relatively inexpensive and fast. The amount of memory required grows rapidly (exponentially) as the number of input signals increases, however, so this embodiment cannot be used for neurons with a large number of inputs.

For DS-neurons with a relatively large number of input signals, the adder 4 of FIG. 8 is complex. Usually digital adders sum only two inputs at a time. Adders with many inputs can be constructed by combining many such two-input adders into a tree. A tree with $2^p$ inputs (where p is some positive integer) requires $2^p-1$ adders, so the amount of equipment required is approximately proportional to the number of input signals. Embodiments of this type are discussed in the section entitled "Adder Embodiments." These embodiments, particularly the Pipelined Adder Tree, allow several tasks to be processed concurrently and are particularly useful for large artificial neural network systems. Hybrid embodiments, which combine memory and an adder tree, and embodiments using analog signals are mentioned below in the sections entitled "Hybrid Embodiments" and "Analog Embodiments."

Because digital adder trees are rather complex systems, an alternative embodiment using analog signals internally is also described in the "Analog Embodiment" section. The advantage here is that multiple input analog adders are easily constructed.

Embodiments which are especially suitable for weight-product-memory dominated DS-neurons intended for inclusion in large integrated circuits are described in the section entitled "Integrated Embodiments."

A. Software Embodiment of DS-Neuron.

An object-oriented computer-software embodiment appears in the C++ program listings attached in the Appendix. The term "neuron object" is used herein for any object which is a member of one of the neuron classes (NEUI, DSNAI, and DSNEU) described below.

Every neuron class has a pair of data members nextOutput and output, and a pair of member functions clock1( ) and clock2( ) which define the output arrangement. The organization separates computations internal to neuron objects from changes in network signal values, so that all network signals can be made to change synchronously. It also allows sequential revision of network values, in which the output value for a neuron object is revised as soon as the computations for the neuron are complete, thereby making the new value the one used in subsequent computations for other neurons.

When clock1( ) is called for a neuron object, the next output value of that object is computed and stored in nextOutput, but output is not changed. Thus, all of the computations corresponding to a time step are performed by calling clock1( ) for each neuron object in the network. Since nextOutput is a protected data member, input values for other neuron objects are not affected by this change.

When clock2( ) is called, the value (in nextOutput) is copied into the public data member output. For synchronous operation, each time step is a two-stage process: the user program calls clock1( ) for all neuron objects, then it calls clock2( ) for all neuron objects. For sequential revision, the user program calls clock1( ), then clock2( ) for each neuron object in sequence.

Because it is useful to have a uniform method of referencing neuron inputs coming from external inputs and other neurons, the software has a hierarchy comprising two base classes (NEUBC and NEUIBC), and three neuron classes (NEUI, DSNAI, and DSNEU).

The root base class NEUBC defines the output data members nextOutput and output, and thereby provides uniform referencing arrangement. This class also defines clock2( ). All of the other classes are derived from this root base class.

External inputs are handled by objects in the neuron input class NEUI, or the delta-sigma analog input class DSNAI described below. The term "input object" is used herein for any object in one of these two classes. In effect, an object in NEUI just holds the corresponding external input value for use by other neuron objects. The first clocking function has an argument which is the input value. A user program delivers an input value to the network by calling clock1 (input) for the appropriate input object.

Class DSNAI has been included to illustrate delta-sigma conversion of graded input values (the name incorporates the term "analog" to suggest both the graded nature of the inputs and its similarity to analog-signal conversion devices based on the same principles). It is similar to class NEUI except for the graded-signal conversion.

Delta-sigma neurons are embodied as neuron objects in class DSNEU. This class is derived from the neuron-with-inputs base class NEUIBC. The latter centralizes the facilities for inputs to neurons, including storage management for weights and pointers to input-supplying objects. Input $x_0$ is the constant 1. DSNEU adds the delta-sigma processing facilities. For simplicity, inputs are treated as bipolar signals so that the summation term for any input is the weight value or its negative, depending on the sign of the input signal.

Figure 9:
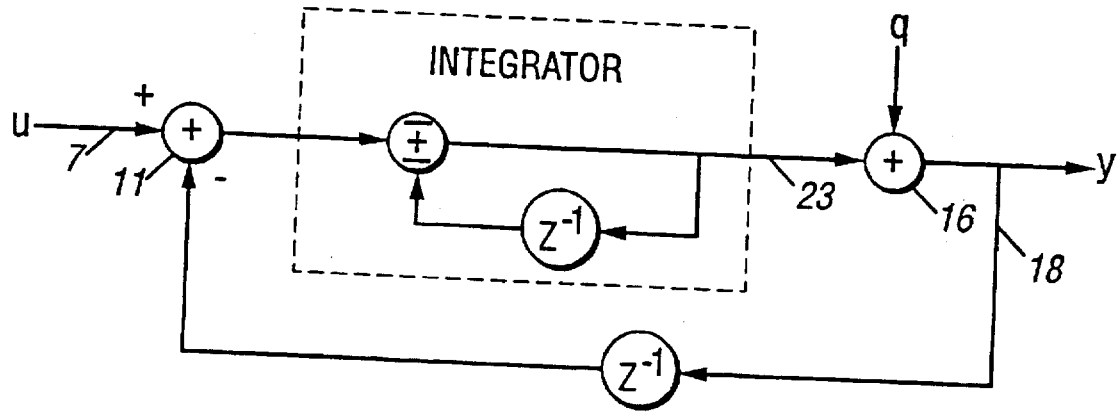
FIG. 9 shows a signal-flow diagram of an alternative embodiment of a discrete-time, first-order saturating delta-sigma modulator.

The signal flow diagram for the delta-sigma modulator used in both DSNAI and DSNEU is shown in FIG. 9. This signal flow diagram is different from, but essentially equivalent to, the diagram shown in FIG. 6. For this diagram, Equation 3 is replaced by $$y_k = u_k + (q_k - q_{k-1}) \tag{6}$$

(so the only difference is the use of $u_k$ instead of $u_{k-1}$).

The class DSNEUDF has been included to illustrate decimation and filtering. A small decimation ratio (4:1) has been used for simplicity.

Application of the classes is illustrated by the main program, which preferably constructs a fully-connected two-layer network and applies it to data arriving on the input stream. Initial data on that stream determines the network by specifying the dimensions of the layers and the weights for neurons in the second layer.

B. Memory-Based DS-Neurons

The term "memory-based" is used to designate neuron embodiments in which some or all of the arithmetic operations are done by looking up values in a table stored in a suitable memory. The type of memory (ROM, RAM, etc.), and the method by which the table of values is loaded into memory are well within the skill of one of ordinary skill and thus are not discussed herein for the sake of simplicity and conciseness.

1. Separate DSM.

In one embodiment of the invention, a memory unit comprises the Neuron Input Unit (NIU) 5 of FIG. 2. The input values $x_0, \ldots, x_n$ taken together form an address into the memory. In particular, in the case of two-state inputs, the sequence $x_n x_{n-1} \ldots x_0$ (where $x_n$ is treated as the most significant digit and $x_0$ the least significant digit) can be considered a binary representation of the address. The word at that address is the transformed weighted-sum signal u (defined in Equation 1) that appears on signal path 7 in FIG. 2. For a constant $x_0$, that input is omitted from the address sequence and the corresponding weight-product is included (by saturated addition) in the memory values.

Conventional input arrangements can be used to access the contents of memory and to encode the adder value. If the number of states of signal $x_k$ is $N_k$, then the set of input values defines a point in the address space of a memory with $N_0 \times N_1 \times \ldots \times N_n$ words (with $N_0=1$ if $x_0$ is constant). The exact nature of the input-to-address mapping is not important provided the word selected by the address is the transformed weighted-sum of the inputs.

The output u of the memory is processed by the separate delta-sigma modulator, element 8 of FIG. 2. The adder in the DSM must have a limiting mechanism, such as a saturating adder, as discussed above and as shown in FIG. 6.

2. Embedded DSM.

Figure 10:
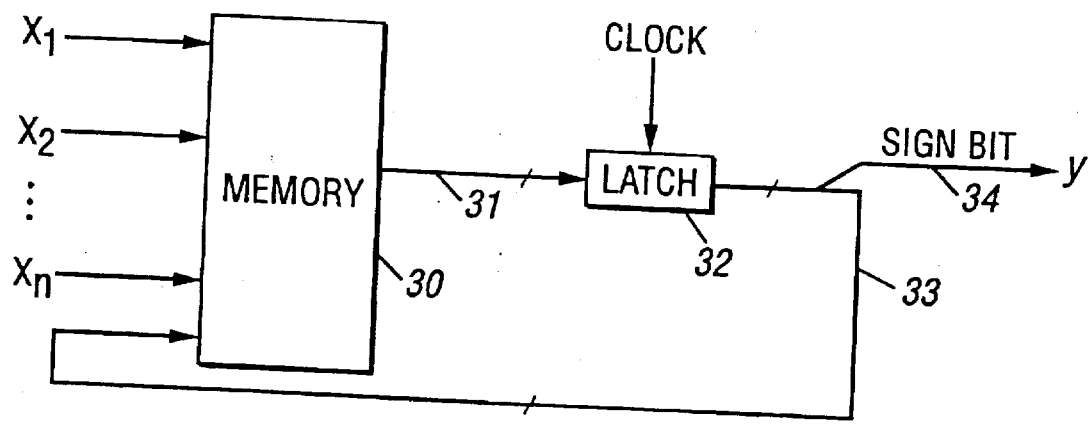
FIG. 10 shows a DS-neuron that incorporates a memory unit that stores all necessary computations, including those for the delta-sigma modulator of FIG. 9, in a table lookup.

The delta-sigma modulator requires addition which can be performed by a memory unit if the neuron has suitable feedback. Referring now to FIG. 10, an embedded DS-Neuron is shown as another embodiment of a neuron with a first-order delta-sigma modulator. The embedded DS-Neuron shown in FIG. 10 generally comprises a memory unit 30 receiving input signals x, $(x_1, x_2, \ldots x_n)$, a latch 32 connected to the output of memory 30 by an output bus 31, and a feedback bus 33 back to an input of memory 30. The constant input $x_0$ has been omitted from the input signal set. Negative values at the output bus 31 of the memory 30 are represented so that a sign-bit signal is a logical 1 for negative values (e.g., using conventional 2's-complement representation). The sign-bit signal or most significant digit 34 from latch 32 is used for the output signal y, although the entire latch output is fed back via bus 33 to the memory 30. Bus 33 provides both feedback for the integrator (in accordance with the DSM of FIG. 6) and the equivalent of the feedback path 18 in FIG. 6.

The DS-neuron of FIG. 10 includes an inherent negation. The output signal y is a logical 1 when the latch 32 holds a negative number, and a logical 0 otherwise. Thus, the values stored in memory 30 must be the negative of those that would otherwise be used. This negation affects the values fed back, so that the table of values stored in memory 30 must be arranged correspondingly. In the embodiment of FIG. 10, the feedback bus 33 connects to an input of the memory 30. The limiting behavior of the saturating adder must be built into the lookup table in memory. The value stored in the look-up table is given by the formula $$-R(w_0+w_1(x_1)+ \ldots +w_n(x_n)+v), \quad (7)$$

where R is the limiting function discussed in connection with FIG. 7, $w_0$ is the constant weight-product value; $w_i(x_i)$ is the weight-product to be added when input number i has the value $x_i$, for $i=1, \ldots, n$; and v is the feedback value.

For a memory that includes suitably latched address inputs, latch 32 can be omitted. If latched address inputs are provided in the memory, the sign-bit (the most significant digit) signal from the memory is used for the output.

C. Adder Tree Embodiments.

Figure 11:
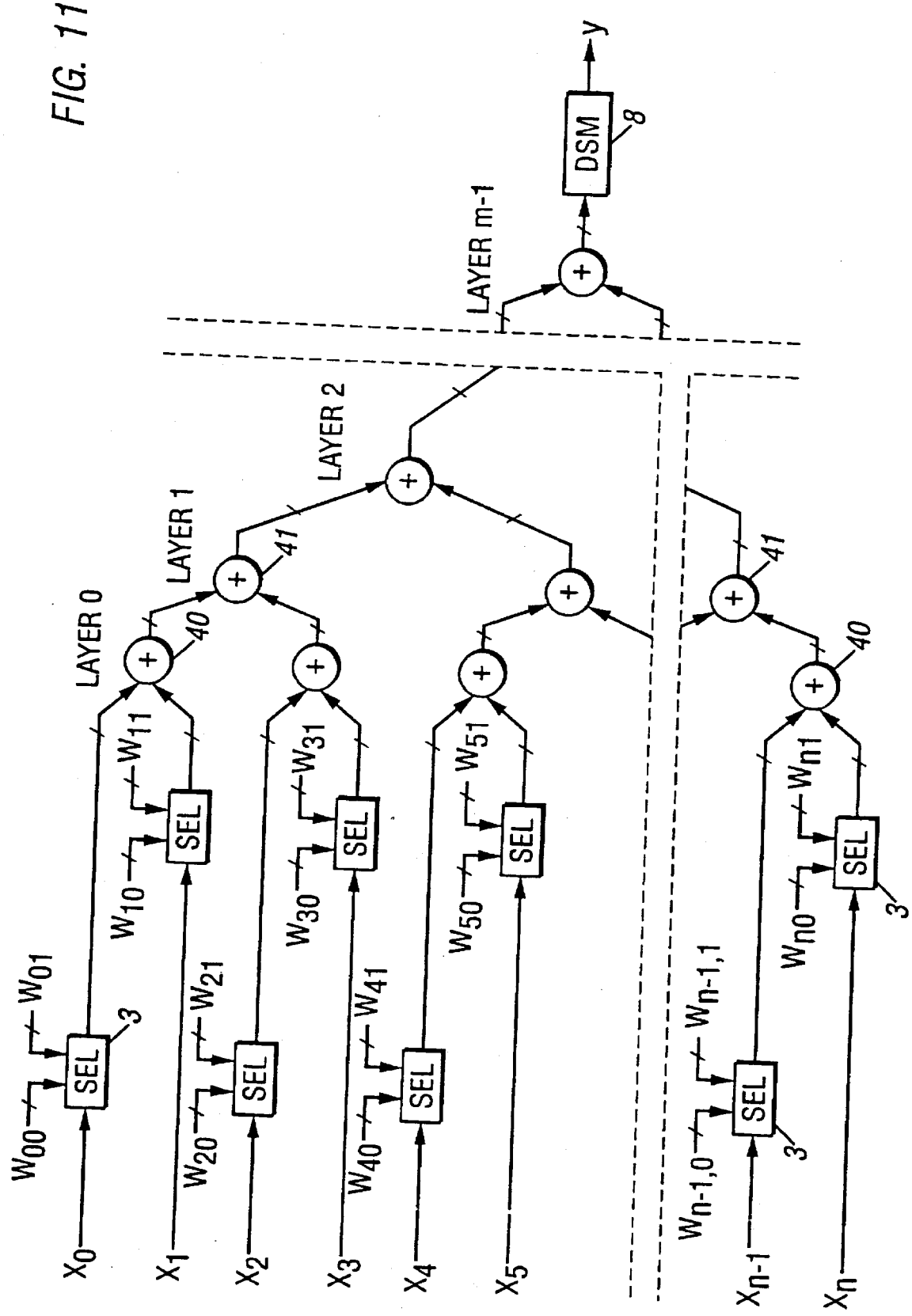
FIG. 11 shows a DS-neuron in which the multiple-input adder of FIG. 8 is embodied as a tree of two-input adders.

Referring now to FIG. 11, a neuron input unit comprising a plurality of two-input adders is shown organized into a tree. For each input signal $x_0, x_1, \ldots, x_n$, a selector 3, comprising a multiplexer selects the appropriate weight-product—that is, the value $w_k x_k$ for input k. These values are delivered in pairs to the adders 40 in Layer 0 and the outputs of those adders are delivered in pairs to the adders 41 in Layer 1. The output of the last layer (Layer m−1) is the weighted-sum of the inputs.

As will be apparent to one skilled in the art, word lengths of the adders must be long enough to handle the data being processed. Because the maximum size of the sums increase with the layer number, it may be useful to have adders capable of more bits in layers with higher-numbers. For systems using binary arithmetic, the maximum word length increases by one bit per layer. An alternative method is to scale the sums between layers. For binary arithmetic this is relatively simple, requiring only a hard-wired shift, but it results in a loss of precision because the least significant digit is lost.

1. Adder Tree with Embedded Delta-Sigma Modulator.

Figure 12A:
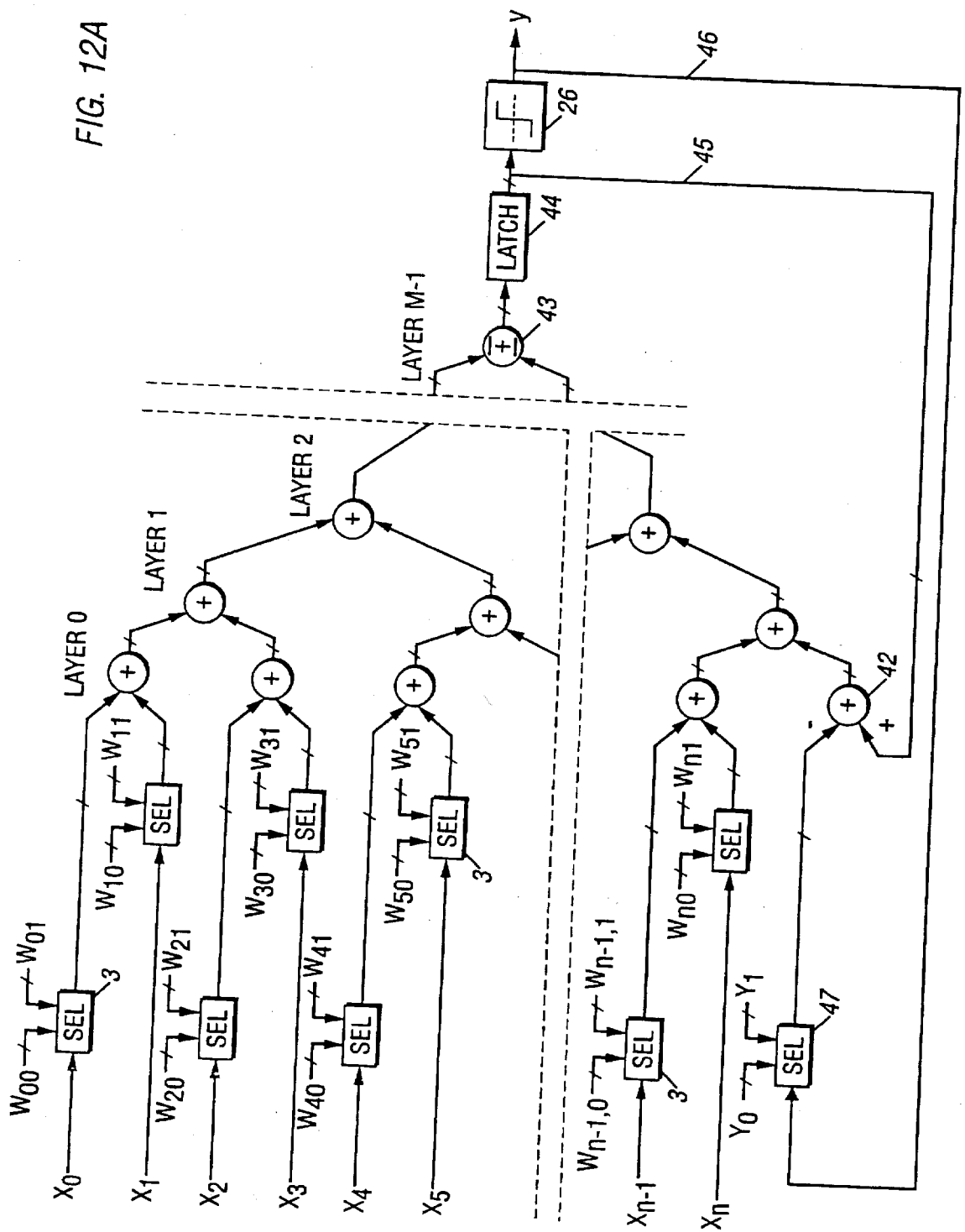
FIGS. 12A and 12B illustrate a DS-neuron in which the feedback paths and saturating adder of the delta-sigma modulator are incorporated into the adder tree of FIG. 11.

In yet another alternative embodiment, a DSM can be embedded in the adder tree as shown in FIG. 12A. Referring to FIGS. 6 and 12A, it can be seen that the adders 11 and 21 of FIG. 6 have been included in the adder tree of FIG. 12A. In FIG. 12A, the feedback paths 45 and 46 are connected to an adder 42 in Layer 0, and the addition effected by adders 11 and 21 of FIG. 6 is distributed among adders in each layer. The NIU and the DSM can no longer be identified as separate structures of FIG. 12A. Output feedback is through selector 47, which provides scaling by selecting the appropriate value $y_0$ or $y_1$ to be added.

While the embodiment of FIG. 12A has more adders than the embodiment in FIG. 11, it forms the basis for a pipelined structure, as described in the following section. FIG. 12A shows the feedback passing through an adder in Layer 0. Alternatively, the feedback path could be connected to an adder in another layer.

2. Pipelined Adder Trees.

Figure 12B:
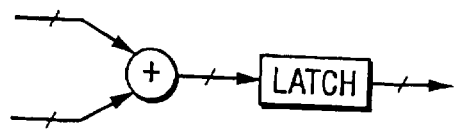

A pipelined organization suitable for multiprocessing can be obtained by adding a latch to the output of each adder in FIG. 12A (except for the final adder 43, which already has a latch 44). One such latch and adder is shown in FIG. 12B, and it will be understood that this structure could be substituted for all adders in FIG. 12A. If a single clock signal is used to operate all of the latches, then during every clock cycle, the output from each adder is strobed into the associated latch, and, as a result, data in one layer is isolated from that in all other layers. Feedback is arranged so that the output signal y at any instant corresponds to data appearing at the input to Layer 0. Thus, a single DS-neuron organized in this way can process data for m different tasks concurrently to achieve "multitasking" capabilities.

A network can be constructed that comprises synchronized DS-neurons of the type shown in FIG. 12A, each having m layers in the adder tree, with m tasks $T_0, T_1, \ldots T_{m-1}$, to be processed by the network. Such a network can be operated so that, for any integers r and t with $0 \leq t \leq m-1$, the output of all DS-neurons at time-step k, with k=r m+t corresponds to task $T_r$. The index t is defined herein as the "task index." The task index t can be obtained as the output of a modulo-m counter (not shown) driven by the system clock (also not shown).

After suitable conditions have been set into all of the latches by a start-up or initialization routine, the network input at time k (with k=r m+t), is the input corresponding to $T_r$. Since the output at time k corresponds to $T_r$, information fed back through signal paths 45 and 46 is combined with input data in Layer 0. The following clock cycles cause this data to be passed through the adder network, until, after m cycles, all additions have been done and the saturated sum appears at the output of latch 44.

The use of the pipelining technique shown in FIGS. 12A-B allows the clock speed to be increased. Signals pass through only once adder for each clock cycle, so variation in delays is much smaller than those which occur in a full adder tree without latches. One skilled in the art will immediately realize that many variations are available. For example, it may not be necessary to place latches, as shown in FIG. 12B, in every layer of the adder tree, but only in every second layer (or every third layer, etc.), in which case the cost can be reduced by using fewer latches. Also, the adders in each layer (except the last) could be partial adders (or carry-save adders) which pass carries to the next layer where they are included in the addition in the adder in that layer. Additional pipelining may be needed in the input selectors and in the output path, but in any case feedback along signal paths 45 and 46 is synchronized with the corresponding input.

The simplest multitasking situation is one in which all tasks use the same set of weight-products and scale factors. Otherwise, the weight-products and scale factors delivered to the selectors 3 and 47 must change according to the task index.

3. Hybrid Embodiments

The number of adders needed in a tree can be reduced by storing partial sums. For example, the input selectors, associated weight-product registers, and Layer 0 adders of FIG. 11 can be replaced by ceiling[(n+1)/2] (or ceiling(n/2) if $x_0$ is constant) memory units, each having two inputs and storing the four possible sums resulting from the corresponding four possible input conditions. Complexity of the input circuits is increased, but more than half of the adders may be removed. This can be extended by replacing more layers of adders.

Because integrated-circuit memory cells are much less complex than adder elements, the use of these memory cells may reduce size of the circuitry required. The size of each memory unit grows rapidly with the number of inputs, so them is an optimum number of layers to replace. The optimum depends on the relative costs in terms of size, speed, money, etc., of memory elements and adder elements.

4. Analog Embodiments.

Yet another alternative arrangement includes selectors or memory units for which the output signal is an analog value (for example, a voltage signal). The adder tree is replaced by an analog adder, and the delta-sigma modulator operates in the analog domain, as illustrated by the first-order DSM with analog integrator in FIG. 3. Thus, digital input signals are converted, by the selectors or memory units, to analog values, which then are added, and the sum is encoded and converted to digital output signals by the delta-sigma modulator. The advantage of this embodiment is that analog adders with many inputs are simpler than corresponding digital adders.

D. Integrated Embodiments.

In some applications of large neural networks, memory for storing the large number of weights is a dominating feature. In the integrated circuit described by Watanabe, et at., "A Single 1.5-V Digital Chip for $10^6$ Synapse Neural Network," *IEE Transactions on Neural Networks*, Vol. 4, No. 3, May, 1993, several arithmetic processors are matched to a large number of memory cells. Processors sequentially process the weights and input data to produce the sums of products for the conventional artificial neurons of the network.

Figure 13:
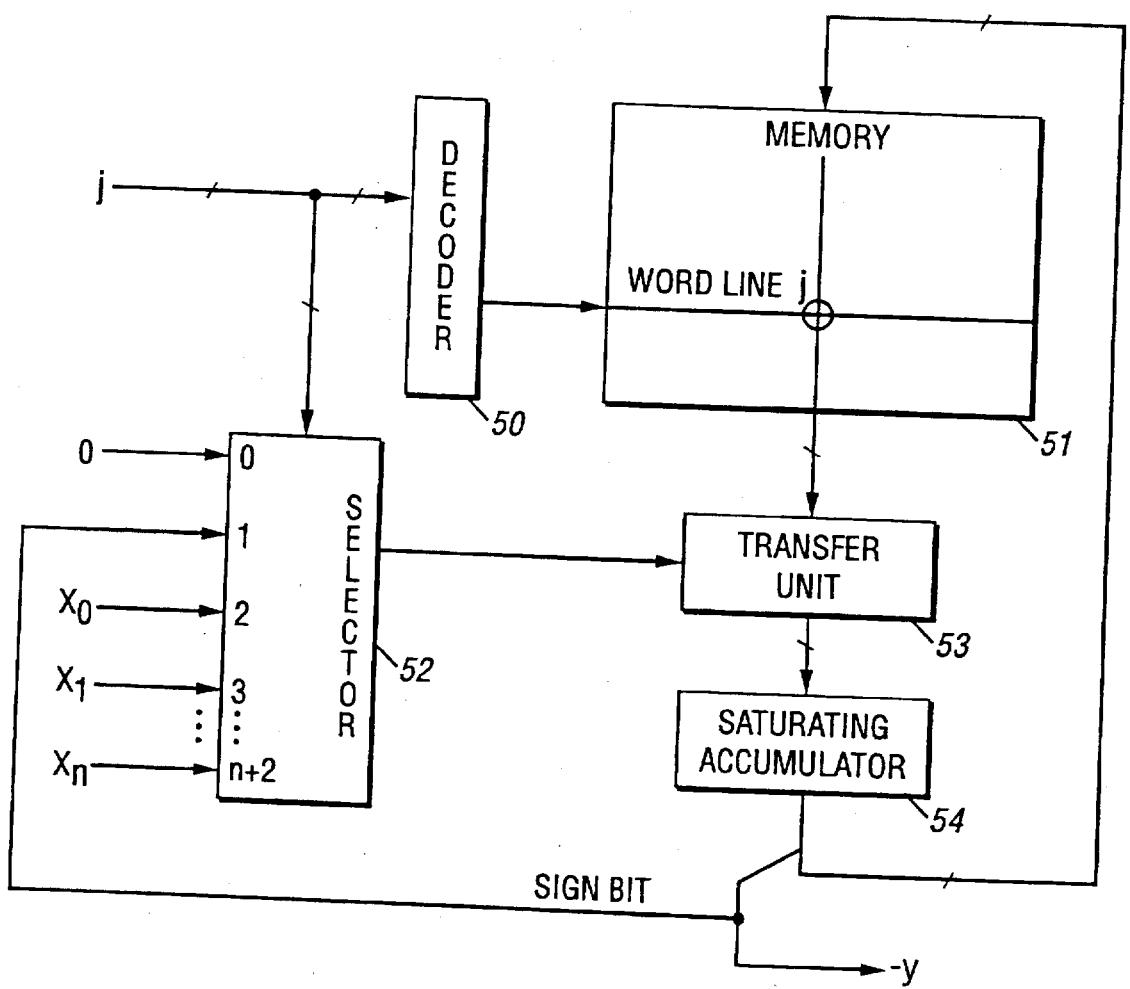
FIG. 13 shows a DS-neuron constructed for implementation into an integrated circuit.

A related system can be used for DS-neurons. Referring now to FIG. 13, a single DS-neuron is shown in an embodiment capable of being embodied in an integrated circuit. The weight-product, or the feedback scale factor, for one logical state of a signal is set as the negative of the weight-product for the other logical state. All additions are performed by a single saturating accumulator 54, which comprises a saturating adder and an associated register to hold the results of the additions. The memory 51 preferably stores n+3 words. The word at address 0, which must be writable as well as readable, preferably is used to store the current value of the integrator output, which is signal 23 in FIG. 9.

Computation for one time-step begins with a control signal to clear the accumulator 54. The index j then steps through the sequence $0, 1, \ldots, n+2$ in the selector 52. At the same time, a value is accessed in memory 51 by decoder 50. This value is transmitted to the transfer unit 53, which modifies the value according to the output of the selector 52. In the preferred embodiment, the transfer unit 53 merely changes the sign of the value depending on the selector output. For each of the steps, an addition is performed in the accumulator 54. When all the steps are completed, the accumulator contains the integrator output value for the time-step (note that, in the terminology used here, there are many "steps" for each DS-neuron "time-step").

For each step, multiplexer 52 selects an appropriate signal, corresponding to the index j, and delivers it to the negation-control input (labeled−) of the transfer unit 53. Simultaneously, decoder 50 selects the memory word-line corresponding to address j, and the memory unit delivers the corresponding word to the transfer unit. The transfer unit negates the value if the negation-control input is a logical 1. The transfer unit sends the word or its negative (that is, the appropriate weight-product or scale factor), depending on the value at the negation-control input, to accumulator 54, which adds it to the accumulating value.

The word at memory address 1 is the negative scale factor for the DSM feedback, which feedback is applied at input 1 of the selector 52. For $j=2, 3, \ldots, n+2$, the word at the memory address is the weight-product corresponding to logic 0 value of input signal $x_{j-2}$.

The sign bit of the saturating accumulator 54 is used for the feedback signal. It also is used for the inverted output signal (shown as −y) after the final accumulation for a time step.

At the end of the first step (for which j=0), the accumulator 54 contains the integrator value stored at the end of the previous time-step (because multiplexer 52 selects the logic 0 constant input). The next step (j=1) adds in the DSM feedback scale factor with an appropriate sign that corresponds to the inverted accumulator sign. In the preferred embodiment, the accumulator sign-bit is logic 1 for negative values. The remaining steps (j=2, 3, \ldots, n+2) add in the weight-products, appropriately negated, if required, according to the corresponding input values.

The final action for a time-step is to store the computed value into the word at memory address 0, and to latch the output value (taken as the complement of the accumulator sign bit). For a DS-neuron with a dedicated accumulator 54, the integrator value need not be stored in memory. The integrator value can be left in the accumulator, which would not be cleared at the beginning of a time-step, and the first step (for which j=0) would be omitted.

The arrangement can be modified so that one accumulator can be shared between a number of DS-neurons. For this arrangement, the memory must be enlarged to store the weight-product values for all of the neurons, and the decoder must be modified so that selection of the word line in memory also depends on the particular neuron being processed. Of course, it is necessary to arrange for delivery to the inputs of the signals $x_0, \ldots, x_n$ corresponding to the neuron, and for proper disposition into an appropriate register of the output signal.

It may be difficult to design the accumulator so that its layout for an integrated circuit matches the spacing for signal lines from the memory. In that case it may be useful to arrange the decoder, memory, and transfer unit so that several words are delivered simultaneously to the transfer unit, which would then deliver these (after negation, if necessary) to the accumulator sequentially. Modification of the selector for the negation-select signal would be necessary, of course. This arrangement could provide a better matching of memory and accumulator speeds in some cases.

E. Serial Operation

As discussed previously, the low resolution of a two-level quantizer is compensated by signal avenging in the low-frequency range of the neural information signal relative to the sampling frequency, as expressed by the oversampling ratio, OSR, which is exhibited in the filtering and decimation at network output sites. In order that the resolution be sufficient for a particular application, a very large value for OSR may be necessary.

It is desirable to keep the sampling rate $f_s$, and thus the OSR, as small as possible, thereby minimizing the amount of computation that must be done. The sampling rate $f_s$ can be reduced if the resolution of neuron output signals is increased by using multilevel quantizers, thereby trading signal value resolution for time-avenging. The following discussion describes an embodiment that uses a multilevel quantizer. The quantizer receives and transmits signal values for each time-step as serial binary values. Computation is distributed, in that calculations are done separately for each bit. These calculations then are combined linearly using appropriate factors, which are powers of two.

Figure 18:
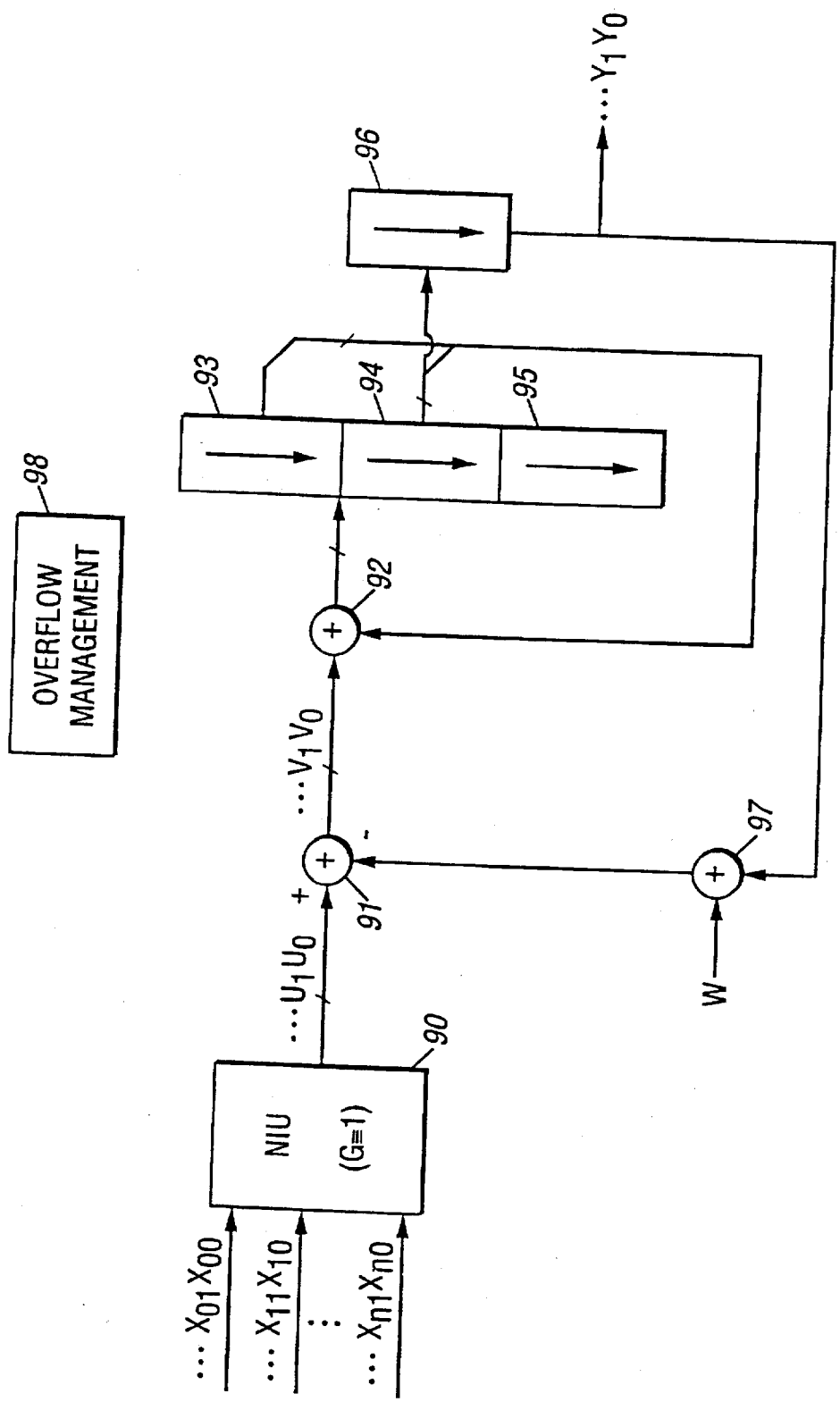
FIG. 18 shows a DS-neuron for which the input and output signal values are transmitted serially.

FIG. 18 is a block diagram for such a neuron. In this embodiment, all input signal values and the output value for a time-step are encoded as signed binary numbers with B bits using 2's-complement representation. If the bits of the input signal $x_j$ are denoted by $x_{j,B-1}, x_{j,B-2}, \ldots, x_{j,1}$, and $x_{j,0}$, where $x_{j,B-1}$ is the highest-order bit, then $$x_j = -2^{B-1}x_{j,B-1} + 2^{B-2}x_{j,B-2} + \ldots + 2x_{j,1} + x_{j,0}. \quad (8)$$

The first component is a negative value because 2's-complement representation has been used. The output signals are encoded in the same way, so that $$y = -2^{B-1}y_{B-1} + 2^{B-2}y_{B-2} + \ldots + 2y_1 + y_0. \quad (9)$$

For any signal, the time order of bits is the same as the subscript order, lowest-order ($x_{j,0}$ or $y_0$) being first, and the signals are synchronized so that all bits with the same subscripts (for different signals) appear on the various signal paths at the same time.

The neuron input unit (NIU) 90 in FIG. 18 is the same as FIG. 8 except that the function G is the identity function. Thus, the intermediate output signal u is the sum of Equation 4, except that bit-number subscripts must be added:

$$u_b = w_0 x_{0,b} + w_1 x_{1,b} \ldots w_n x_{n,b}, \quad (10)$$

for b=0,1,..., B−1. Note that the signal $u_b$ is, in general, a multibit quantity.

The bits for the output value (computed in the previous time-step) are shifted out of shift-register 96, and scaled in unit 97, if necessary, by the scale-factor w to produce the feedback value sequence $w\, y_0, \ldots, w\, y_{B-1}$. These values may be multibit.

Referring still to FIG. 18, adder 91 combines the bit values, producing $$v_b = u_b - w\, y_b. \quad (11)$$

The output v, which is the sum, from adder 91, may be represented as:

$$v = -2^{B-1}v_{B-1} + 2^{B-2}v_{B-2} + \ldots + 2v_1 + v_0. \quad (12)$$

This is the same value that appears at the output of adder 11 in FIG. 6 (but which does not show the scaling by w). The sum v is computed by first adding the bit values, scaled by the weights $w_j$ and w as appropriate, then combining the resultant values as if they are bits in a binary number with 2's-complement representation.

The adder 92, shift registers 93, 94, and 95, and associated overflow management circuitry 98 embody both a processing unit for v and the equivalent of the integrator found in FIG. 6 as units 20 and 21, and the associated feedback path. The length (in bits) of each of the shift registers 93, 94, and 95 is equal to the value of B.

At the beginning of a time-step, the 2's-complement binary representation of the current integrator value is held in 93 and 94, with the high-order part (or most significant digit) in 93. In each cycle (corresponding to bit index b), the corresponding value $V_b$ is added to (or subtracted from if b=B−1) the value in that register pair, and the three registers 93, 94, 95 are shifted as a unit by one bit toward the low-order bits, with the low-order bits of 93 and 94 moving into the high-order bits of 94 and 95, respectively. The carry from the addition in adder 92 moves into the high-order position of register 93. The shifting provides the multiplication by powers of 2 that appears in Equation 12. After B cycles, the new integrator value appears in the registers. Overflow management circuitry 98 adjusts this process so that the new integrator value as computed by saturated addition appears in 94 and 95, the low-order register pair.

The last action for a particular time-step is to transfer the contents of register 94 to registers 93 and 96, and the contents of register 95 into register 94. This establishes the initial conditions for the next time step, with the new output value in register 96, and the new integrator value in register pair 93, 94.

One skilled in the art will recognize that the arrangement of FIG. 18 can be incorporated into that of FIG. 13 by suitably modifying the saturating accumulator 54 to accommodate the shifting actions of registers 93, 94, and 95 of FIG. 18, and by providing a suitable feedback/output register arrangement (corresponding the register 96 of FIG. 18) for the feedback and output signals. The serially-shifted output of the said feedback/output register arrangement would be the serial bit-stream output of the neuron, and it would be fed back through input 1 of selector 52, the shifting of said feedback/output register arrangement being bit-synchronized with the input signals.

At the beginning of a time-step, the saturating accumulator and the feedback/output register arrangement would be loaded with values from the previous time-step. Then steps corresponding to j=1,2, ..., n+2 would be executed for each of the B bits of the input signals, with the feedback/output register being shifted correspondingly (step j=0, the loading of the saturating accumulator, being omitted). Finally, after all B bits for a time-step had been processed, the accumulated value in the saturating accumulator would be stored (preferably into memory address zero) for use in the next time-step.

II. USE OF DS NEURON IN LINEAR PROCESSING

Figure 14:
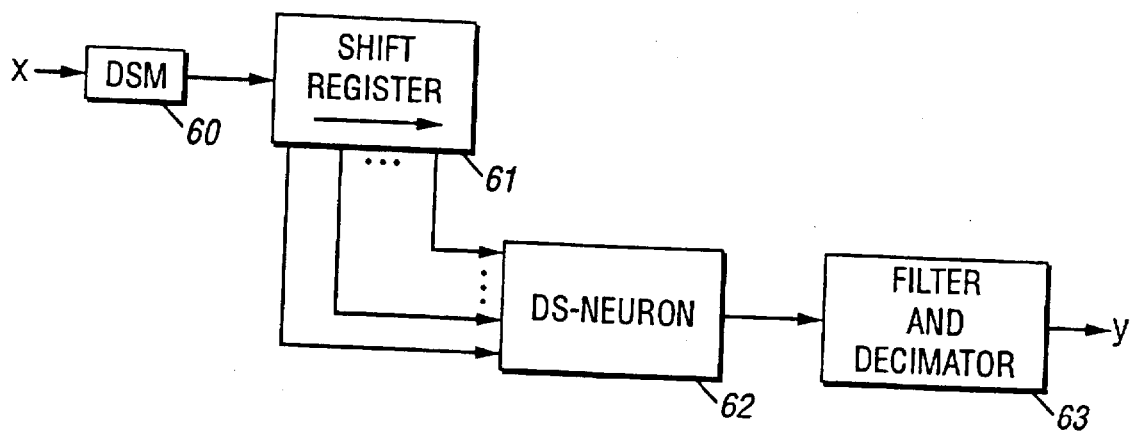
FIG. 14 illustrates a block diagram of a finite impulse response (FIR) filter implemented by use of a DS-neuron as shown in FIG. 2.
Figure 15:
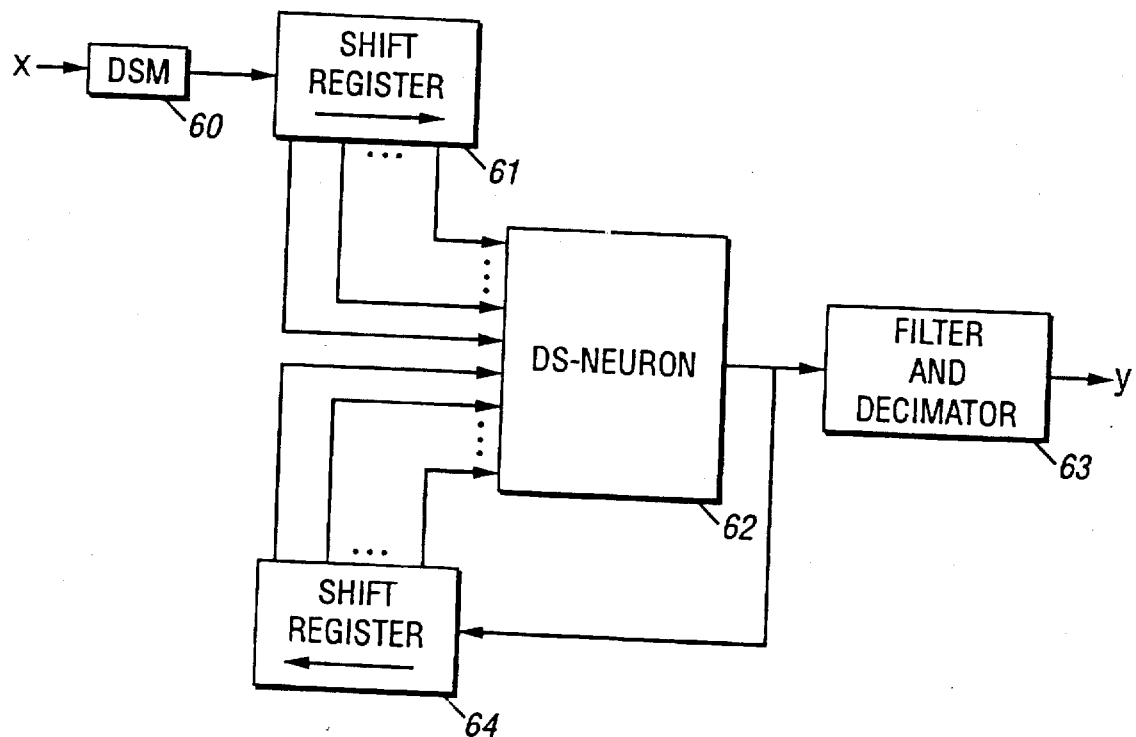
FIG. 15 illustrates a block diagram of an infinite impulse response (IIR) filter implemented-by use of a DS-neuron as shown in FIG. 2.

Referring now to FIGS. 14 and 15, DS-neurons in arrangements that provide linear processing will now be discussed. If the transform function G (as shown in the DS-neuron of FIG. 8) is linear and the input signal levels x are sufficiently low, the DS-neuron operates as a linear combiner, except that the output requires a filter and decimator 63 to eliminate the modulator noise. Appropriate training algorithms can be used to make it into an adaptive linear combiner. For a discussion of adaptive linear combines, see Chapter 2 of Widrow and Stearns, *Adaptive Signal Processing* (Printice-Hall) 1985.

The conventional adaptive linear combiner can be adapted for conventional digital signal processing, as shown in FIG. 14. An input signal x (in any form, analog, digital, etc.) is converted by a delta-sigma modulator 60 into an input signal for the DS-neuron 62, such as is shown, for example, in FIG. 8. Referring still to FIG. 14, the convened signal values are passed to the DS-neuron via a shift register 61. The output signals of the shift register 61, which are signal values that have been delayed, are weighted and summed by the DS-neuron. If both the input delta-sigma modulator 60 and the DS-neuron 62 are operating as linear devices, i.e., G is linear, the result is a finite-impulse response (FIR) filter. Appropriate low-pass filtering and decimation of the output signal, shown as unit 63, preferably are provided.

Referring still to FIG. 14, the output delta-sigma modulator 8 (shown in FIG. 8) of the DS-neuron may not be necessary, in this ease, except possibly for conversion of the signal form; for example, from a signal having many states—as with parallel multibit values—to a signal with two states. Conversion of the signal form is desirable for the infinite impulse respone (IIR) filter shown in FIG. 15, in which the output signal y of the DS-neuron 62 is fed back through shift register 64 to the DS-neuron inputs.

Referring still to FIGS. 14 and 15, if the outputs of the input delta-sigma modulator 60 and DS-neuron 62 are two-state signals, then the physical arrangement of the FIR and IIR filters becomes quite simple—the shift registers preferably are only one bit wide, and the multiplications by the filter coefficients are multiplications by weights in the DS-neuron. By providing an appropriate mechanism for changing the weight-products in the DS-neuron, the filter can be made adaptive.

III. SENSOR SYSTEMS USING DS NEURONS

Figure 16:
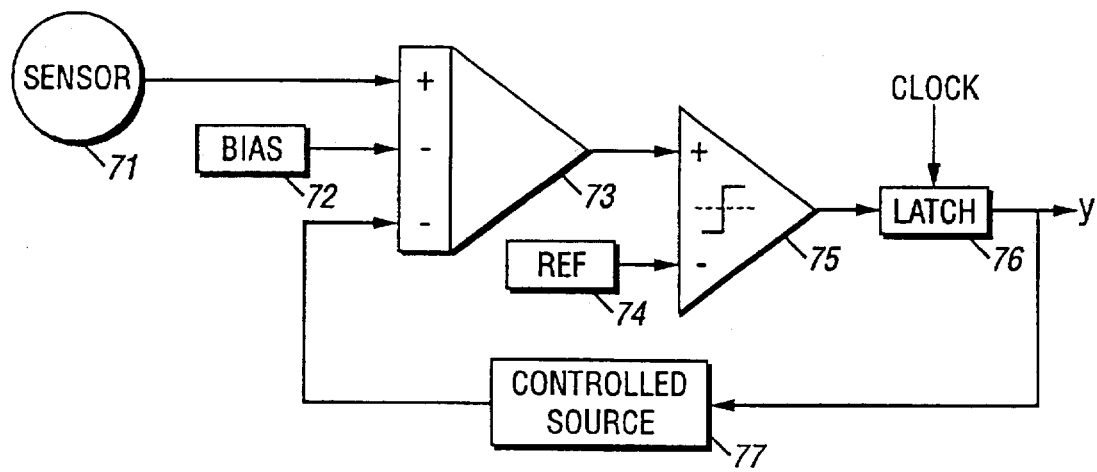
FIG. 16 depicts a generic sensor with an embedded delta-sigma modulator for use as an input to a neural processing network.
Figure 17:
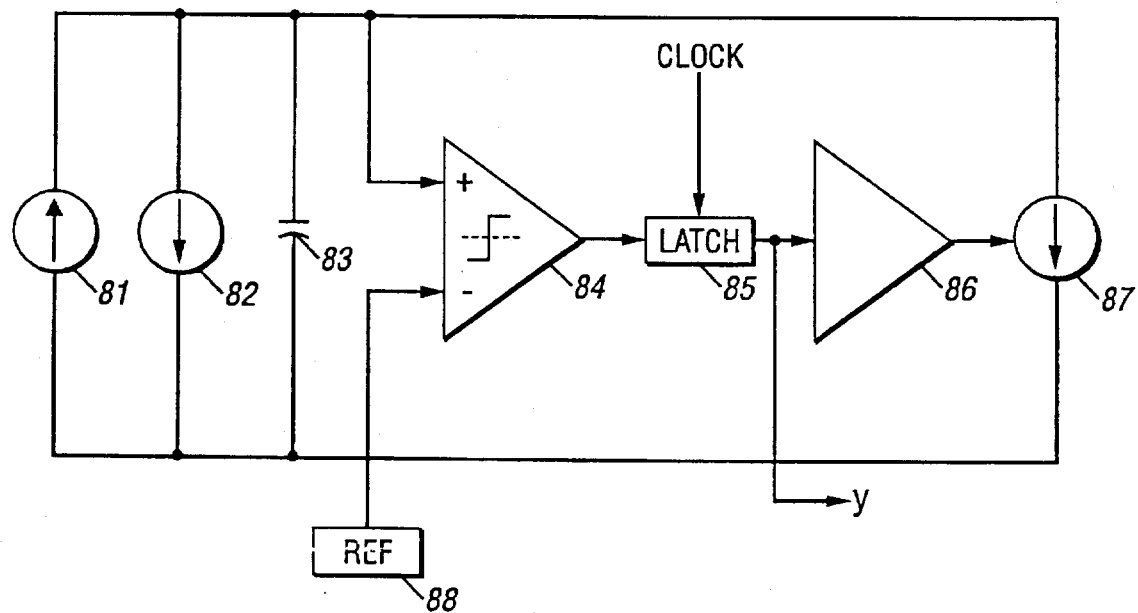
FIG. 17 depicts a charge-integrating sensor with embedded delta-sigma modulator for use as an input to a neural processing network.

Referring now to FIGS. 16 and 17, the underlying concept of the present invention can also find application in sensor systems with output signals that are to be provided as inputs to a neural processing network. In certain applications the delta-sigma modulator can be incorporated into sensors to condition the output signal from the sensor for use as an input signal into a neural network. FIG. 16 shows a generic sensor that can readily be used as an input to a neural network. The signal from the sensor 71 passes to integrator 73 which additively combines it with inverted inputs from a bias source 72 and a controlled source 77. The time-integrated sum of integrator 73 is compared with a reference voltage 74 to produce the output of the comparator 75. That output is latched periodically by unit 76, whose output is both the control signal for controlled source 77 and the output signal y of the sensor system, which can be transmitted directly to a neural network as an input signal.

FIG. 17. shows a charge-integrating sensor also using a delta-sigma modulator as part of the sensor output. Sensor 81 delivers a charge dependent on the physical quantity being sensed. The charge is integrated in capacitor 83. Current source 82 is the bias source corresponding to the bias source 72 in FIG. 16. Voltage comparator 84, reference voltage source 88, and latch 85 correspond to units 75, 74, and 76 in FIG. 8, respectively. Controller 86 and controlled current source 87 form the controlled source corresponding to unit 77 in FIG. 8.

As an example, if unit 81 is a photodiode, FIG. 17 represents a light sensor. An array of such sensors coupled via output signals y to an array of DS-neurons forms an intelligent vision system. Obviously, the same can be done with arrays which sense physical quantities other than light.

Although most of this discussion has based on synchronous operation of the delta-sigma modulators, it is possible to operate the devices asynchronously, and this can be applied to any part of this invention.

While a preferred and several alternative embodiments and applications of the present invention have been disclosed and described, various other embodiments are possible without departing from the principles of the present invention.

APPENDIX

Oct  6 15:58 1993  dsexampl.cpp Page 1

```cpp
// File DSEXAMPL.CPP

// This program reads data from the input stream and sends the
// output of the delta-sigma neural network to the output stream.
// The network has N0 input nodes, and N1 output nodes.  All
// output nodes are connedted to all other nodes (input and output).
// The input stream data is in the following order:
//     N0 N1 Rminus Rplus delsum NStep
//     w(0,1)  w(1,1)  ... w(N0,1)  w(N0+1,1)  ... w(N0+N1,1)
//     w(0,2)  w(1,2)  ... w(N0,2)  w(N0+1,2)  ... w(N0+N1,2)
//      ...
//     w(0,N1) w(1,N1) ... w(N0,N1) w(N0+1,N1) ... w(N0+N1,N1)
// where
//     w(j,k) is one of the weights for output neuron j:
//            if j = 0, it is the bias weight (w[0]);
//            if 1 <= j <= N0, it is the weight for the input from
//               input neuron j; and
//            if N0 < j, it is the weight for input from output
//               neuron j - N0.
//
// The output for each time step is the output from each of the
// output neurons in index order.  Decimated and filtered (4:1,
// cascade low-pass comb) output is displayed, also.

// ----- Inclusions ----- include <iomanip.h>    // C++:    Stream mainpulators.
include <iostream.h>   // C++:    Basic v.2.0 I/O streams.
#include "dsneuh.h"

// ----- Main program ----- void main (int argc, char * argv)
   {
   int     i,j,k;    // Utility variables.
   int     N0;       // The size of the input layers.
   int     N1;       // The size of the output layers.
   typeS   Rminus;   // The lower sum limit.
   typeS   Rplus;    // The upper sum limit.
   typeS   delsum;   // The global value of delsum.
   int     NStep;    // The number of time steps to be done.
   typeW   w;        // A place for a weight value.
   typeS   v;        // A place for an input value.

// ---- Read, N0 and N1, the layer sizes. ----
   cin >> N0 >> N1;
   cin >> Rminus >> Rplus;
   cin >> delsum;
   cin >> NStep;
```

Oct  6 15:58 1993   dsexampl.cpp Page 2

```cpp
  cout << "Inputs:          " << N0 << endl;
  cout << "Output neurons: " << N1 << endl;
  cout << "Bounds on sums: " << Rminus << " " << Rplus << endl;
  cout << "delsum =         " << delsum << endl;

// ---- Build the layers and connect them. ----
  NEUI** inLayer   = new NEUI* [N0];
  for (i=0; i<N0; ++i) inLayer[i] = new NEUI (0);

cout << "\nIndex: Weights:" << endl;
  DSNEU**   outLayer = new DSNEU* [N1];
  DSNEUDF** dfLayer  = new DSNEUDF* [N1];
  for (i=0; i<N1; ++i)
    {
      outLayer[i] = new DSNEU (N0+N1,0);
      outLayer[i]->setR( Rminus,Rplus );
      outLayer[i]->setDelsum( delsum );
      dfLayer[i]  = new DSNEUDF (0);
      k = 0;
      cin >> w;
      outLayer[i]->setW(k++,w);
      cout << setw(3) << i << ": " << setw(5) << w;
      for (j=0; j<N0; ++j,++k) {
                                cin >> w;
                                outLayer[i]->setSource(k,inLayer[j]);
                                outLayer[i]->setW(k,w);
                                cout << setw(5) << w;
                              }
      for (j=0; j<N1; ++j,++k) {
                                cin >> w;
                                outLayer[i]->setSource(k,outLayer[j]);
                                outLayer[i]->setW(k,w);
                                cout << setw(5) << w;
                              }
      dfLayer[i]->setSource(1,outLayer[i]);
      cout << endl;
    }

// ---- Do NStep time steps. ----
   cout << "\nStep: Input values: Output values" << endl;
   for (i=0; i<NStep; ++i)
     {
       cout << setw(3) << i << ": ";
           // ---- Input layer clocking. ----
       for (j=0; j<N0; ++j) {
                             cin >> v;
                             inLayer[j]->clock1(v);
                             cout << setw(3) << v;
                            }
```

-24-

Oct  6 15:58 1993   dsexampl.cpp Page 3

```
        for (j=0; j<N0; ++j) inLayer[j]->clock2();
        cout << ": ";
                // ---- Output layer clocking. ----
        for (j=0; j<N1; ++j) outLayer[j]->clock1();
        for (j=0; j<N1; ++j) {
                             outLayer[j]->clock2();
                             cout << setw(3) << outLayer[j]->output << " ";
                         }
        cout << ": ";
                // ---- Filter layer clocking. ----
        for (j=0; j<N1; ++j) dfLayer[j]->clock1();
        for (j=0; j<N1; ++j) {
                             dfLayer[j]->clock2();
                             cout << setw(3) << dfLayer[j]->output << " ";
                         }
        cout << endl;
    }
}
```

-35-

```
Oct  6 15:33 1993  dsneu.cpp Page 1

// File DSNEU.CPP (Delta-Sigma Neuron Classes)

// Copyright (c) 1993 by George W. Batten, Jr., Houston, Texas

// Version date:
  //      4Oct93 08:13 - Modified for patent application.
  // Previous versions:
  //      1Sep93 11:00 - Created from SDLIN.CPP //-----------------------------------------------------------------------
  // ---- Inclusions ---- include "dsneuh.h"

//-----------------------------------------------------------------------
  //-----------------------------------------------------------------------
  // Class NEUIBC Member Functions NEUIBC::NEUIBC( int initNw, typeS initOutput)         // Constructor
    : NEUBC( initOutput)
          {
          Nw       = initNw;
          w        = new typeW [Nw+1];
          assert( w != NULL );
          source   = new NEUBC* [Nw+1]; // source[0] is not used.
          assert( source != NULL);
          for (int i=0; i<=Nw; ++i)
            {
            w[i]      = 1;
            source[i] = NULL;
            }
          w[0]     = 0;
          }

NEUIBC::NEUIBC (NEUIBC& sourceNEUIBC)                 // Copy Constructor
    : NEUBC( sourceNEUIBC.output)
          {
          Nw       = sourceNEUIBC.Nw;
          w        = new typeW [Nw+1];
          assert( w != NULL );
          source   = new NEUBC* [Nw+1]; // source[0] is not used.
          assert( source != NULL);
          for (int i=0; i<=Nw; ++i)
            {
            w[i]      = sourceNEUIBC.w[i];
            source[i] = sourceNEUIBC.source[i];
            }
          w[0]     = sourceNEUIBC.w[0];
          }
```

```
Oct  6 15:33 1993  dsneu.cpp Page 2

// End (Class NEUIBC Member Functions)

//----------------------------------------------------------------------
  //----------------------------------------------------------------------
  // Class DSNAI Member Functions void DSNAI::clock1 (typeS input)              // Compute nextOutput
          {
             sum += input;
             if       (Rplus < sum)  sum = Rplus;   // DSM sum limiting.
             else if (sum < Rminus) sum = Rminus;
             if (0 <= sum)
                {
                  nextOutput = 1;
                  sum -= delsum;
                }
             else
                {
                  nextOutput = -1;
                  sum += delsum;
                }
          }

// End (Class DSNAI Member Functions)

//----------------------------------------------------------------------
  //----------------------------------------------------------------------
  // Class DSNEU Member Functions void DSNEU::clock1 ()                         // Compute nextOutput
          {
             int i;
             typeS u;
             for (u=w[0],i=1; i<=Nw; ++i)
                {
                  if (0 <= source[i]->output) u += w[i];
                  else                        u -= w[i];
                }
             // --- Insert funcition G here, if needed. ---
             sum += u;
             if       (Rplus < sum)  sum = Rplus;   // DSM sum limiting.
             else if (sum < Rminus) sum = Rminus;
             if (0 <= sum)
                {
                  nextOutput = 1;
                  sum -= delsum;
                }
             else
                {
                  nextOutput = -1;
```

Oct  6 15:33 1993  dsneu.cpp  Page 3

```
              sum += delsum;
         }
      }

// End (Class DSNEU Member Functions)

//----------------------------------------------------------------
//----------------------------------------------------------------
// Class DSNEUDF Member Functions void DSNEUDF::clock1 ()                      // Compute nextOutput
      {
            // -------- Decimate and filter to get nextOutput --------
            //               - Decimation ratio = 4:1.
            // **** Note: this does not handle overflow conditions
            // ****         correctly.
         s0 += source[1]->output;
         s1 += s0;
         if (--nd <= 0)
           {
             nextOutput = d01 - d00;
             d01 = d00;
             d00 = d11 - d10;
             d11 = d10;
             d10 = s1;
             nd  = 4;
           }
      )

// End (Class DSNEUDF Member Functions)
```

-38-

Oct  6 15:53 1993  dsneuh.h Page 1

```cpp
// File DSNEUH.H - Delta-sigma Neuron - Header file.

// Copyright (c) 1993 by George W. Batten, Jr., Houston, Texas

// Version Date
//   4Oct93 08:13 - Modified for patent presentation.
// Previous Version
//   1Sep93 10:40 - Created from SDLINH.H ifndef __DSNEU_H
define __DSNEU_H

//#include <iomanip.h>    // C++:     Stream mainpulators.
//#include <iostream.h>   // C++:     Basic v.2.0 I/O streams.
#include <assert.h>       // ANSI C:  Debugging: assert macro.
#include <stdlib.h>       // Standard library header.

//---------------------------------------------------------------
// Miscellaneous Definitions ------------------------------------ typedef float typeW;   // The type for weight values.
typedef float typeS;   // The type for signal values.

// End (Miscellaneous Definitions)
//---------------------------------------------------------------
// Class Definitions --------------------------------------------

// ---------- Neuron Base Class ---------- class NEUBC
  {
    public:
              NEUBC (typeS initOutput)                   // Constructor.
                {output = nextOutput = initOutput;};
              NEUBC( NEUBC& sourceNEUBC )                // Copy Constructor
                {
                  output     = sourceNEUBC.output;
                  nextOutput = sourceNEUBC.nextOutput;
                };
      virtual ~NEUBC() {}                                // Destructor.
              void clock2()             // Function placing nextOutput
                {output = nextOutput;}  //    into output.
      typeS   output;          // The current output value.

protected:
              NEUBC() {}          // Default constructor: not to be used.
      typeS   nextOutput;   // The next output value.

private:
```

Oct  6 15:53 1993   dsneuh.h Page 2

```
  };   // End of class NEUBC definition.

// ---------- Neuron-with-Inputs Base Class ---------- class NEUIBC : public NEUBC
    {
      public:
                 NEUIBC( int initNw, typeS initOutput );   // Constructor.
                 NEUIBC( NEUIBC& );                         // Copy Const.
        virtual -NEUIBC()                                   // Destructor.
                   {delete[] source; delete[] w;}
                 void setSource( int i, NEUBC * newSource ) // Set source i.
                   {source[i] = newSource;}
                 void setW( int i, typeW newW )             // Set weight i.
                   {w[i] = newW;} protected:
//               NEUIBC() {}                  // Default constructor: not to be used
        int      Nw;                          // The no. of input signals (excl. the unit).
        typeW *  w;                           // Pointer to the weight array.
        NEUBC ** source;                      // Pointer to the source pointer array.

private:

// Notes: 1. Nw is the number of input signals, excluding the unit
      //           input signal with weight w[0]. The indices for the
      //           actual input signals range from 1 to Nw.
      //        2. Each item  source[i]  is a pointer to a neuron (that is,
      //           an object of class NEUBC). The output of that neuron
      //           is input number  i  for the current neuron.
      //        3. nextOutput is included so that synchronous operations
      //           can be simulated.
    };   // End of class NEUIBC definition.

// ---------- Neuron Input Class ---------- class NEUI : public NEUBC
    {
      public:
                 NEUI( int initOutput )                     // Constructor
                   : NEUBC( initOutput ) {}
                 NEUI( NEUI& ) {}                           // Copy Const.
        virtual -NEUI() {}                                  // Destructor.
                 void clock1( typeS newOutput )             // Set the output.
                   {nextOutput = newOutput;} private:
                 NEUI() {}                    // Default constructor: not to be used.
    };   // End of class DSNI definition.
```

-40-

Oct 6 15:53 1993 dsneuh.h Page 3

```
// ---------- Delta-Sigma Neuron Analog Input Class ---------- class DSNAI : public NEUBC
    {
    public:
                DSNAI( int initOutput )                         // Constructor
                    : NEUBC( initOutput )
                    {
                        delsum = 1;     // Default value = 1.
                        sum    = 0;
                    }
                DSNAI (DSNAI& sourceDSNAI)                      // Copy Constructor
                    {
                        delsum = sourceDSNAI.delsum;
                        sum    = sourceDSNAI.sum;
                    }
        virtual ~DSNAI() {}                                     // Destructor.
                void clockl(typeS input);                       // Internal clock.
                void setDelsum( typeS newDelsum)
                    ( delsum = newDelsum;)
                void setRminus( typeS newRminus)                // Set lower bound.
                    ( Rminus = newRminus; )
                void setRplus( typeS newRplus)                  // Set upper bound.
                    ( Rplus = newRplus; )

protected:
        typeS   sum;        // The current sum value.
        typeS   delsum;     // The delta-sigma output increment for sum (>=0)
        typeS   Rminus;     // Lower bound for sums.
        typeS   Rplus;      // Upper bound for sums.

private:
                DSNAI() {}                  // Default constructor: not to be used.
    }; // End of class DSNAI definition.

// ---------- Delta-Sigma Neuron Class ---------- class DSNEU : public NEUIBC
    {
    //      1 -----> w[0] -------
    //                           \         Possible function (G).
    //    x[1] -----> w[1] ------ \      / Limiting      Sum
    //                           \ \    |  /Function.    |
    //    x[2] -----> w[2] ------\ \ |  v  |             v
    //                            \ \|  +  v             v
    //     ...          -----+-+-----> +-- 1/(1-1/z) --Thresh--+--output
    //                      / /  u     ^-                      |
    //     ...          ----/          |                       |
    //                     /           +-------- 1/z <---------+
    //    x[Nw] -----> w[Nw] -----
```

-41-

Oct  6 15:53 1993   dsneuh.h Page 4

```cpp
    public:
                DSNEU( int initNw, typeS initOutput )     // Constructor
                  : NEUIBC( initNw, initOutput )
                    {
                     delsum = 1;       // Default value = 1.
                     sum    = 0;
                    }
                DSNEU (DSNEU& sourceDSNEU)                // Copy Constructor
                  : NEUIBC( sourceDSNEU.Nw, sourceDSNEU.output)
                    {
                     delsum = sourceDSNEU.delsum;
                     sum    = sourceDSNEU.sum;
                    }
        virtual ~DSNEU() {}                               // Destructor.
                void setDelsum( typeS d ) {delsum = d;}   // Set delsum.
                void clearSum () {sum = 0;}               // Clear the internal sum.
        virtual void clock1 ();                           // Compute nextOutput.
                void setR( typeS newRminus, typeS newRplus) // Set bounds.
                  { Rminus = newRminus; Rplus = newRplus;} protected:
       typeS    sum;       // The current sum value.
       typeS    delsum;    // The delta-sigma output increment for sum (>=0)
       typeS    Rminus;    // Lower bound for sums.
       typeS    Rplus;     // Upper bound for sums.
//              DSNEU() {}                    // Default constructor: not to be used private:
    }; // End of class DSNEU definition.

// ---------- Delta-Sigma Decimation/Filtering Class ---------- class DSNEUDF : public NEUIBC
   {
     public:
                DSNEUDF( typeS initOutput )   // Constructor
                  : NEUIBC( 1, initOutput )
                    {
                      dsmNext = 0;
                      nd      = 0;
                      s0 = s1 = 0;
                      d00 = d01 = d10 = d11 = 0;
                    }
        virtual ~DSNEUDF() {}                             // Destructor.
                void clock1 ();                           // Compute nextOutput.

protected:
       typeS   dsmNext;            // The next DSM output value.
       int     nd;                 // Decimation counter.
```

Oct 6 15:53 1993 dsneuh.h Page 5

```
    typeS   s0;                 // Sum 0 register.
    typeS   s1;                 // Sum 1 register.
    typeS   d00,d01,d10,d11;    // Difference registers.

private:
//          DSNEUDF() {}        // Default constructor: not to be used.
            DSNEUDF (DSNEUDF& sourceDSNEUDF)        // Copy Constructor:
              : NEUIBC( 1, sourceDSNEUDF.output ) {} //    inaccessable.
};  // End of class DSNEUDF definition.

#endif  // #ifndef __DSNEU_H
```

I claim:

1. A sensor for use in a neural network, comprising:

a sensor for sensing a parameter and outputting an analog signal;

an integrator coupled to said sensor, said integrator receiving the analog signal and outputting an integrated signal;

a comparator receiving said integrated signal and comparing said integrated signal with a reference value, and producing a two-state signal in response;

a latch receiving said two-state signal, and providing an output signal to said neural network.

2. A sensor as in claim 1, wherein the output signal of said latch is provided as an input signal to a controlled source, said controlled source producing a feedback signal that is applied as an input to said integrator.

3. A sensor as in claim 1, wherein said neural network comprises a network of delta sigma neurons, each of which comprises a neuron input unit and a delta sigma modulator.

4. A sensor as in claim 1, wherein said sensor comprises a photosensor.

5. A sensor as in claim 4, wherein said neural network comprises an intelligent vision system.

* * * * *